United States Patent
Arakawa et al.

(10) Patent No.: US 10,444,519 B2
(45) Date of Patent: Oct. 15, 2019

(54) IMAGE PROJECTION DEVICE

(71) Applicants: QD LASER, INC., Kawasaki-shi (JP); THE UNIVERSITY OF TOKYO, Tokyo (JP)

(72) Inventors: Yasuhiko Arakawa, Tokyo (JP); Mitsuru Sugawara, Kawasaki (JP); Makoto Suzuki, Kawasaki (JP); Michio Arai, Kawasaki (JP)

(73) Assignees: QD LASER, INC., Kawasaki-shi (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 15/579,750

(22) PCT Filed: Apr. 26, 2016

(86) PCT No.: PCT/JP2016/063002
§ 371 (c)(1),
(2) Date: Dec. 5, 2017

(87) PCT Pub. No.: WO2016/208266
PCT Pub. Date: Dec. 29, 2016

(65) Prior Publication Data
US 2018/0164595 A1  Jun. 14, 2018

(30) Foreign Application Priority Data

Jun. 25, 2015 (JP) .................................. 2015-127868
Dec. 15, 2015 (JP) .................................. 2015-244557

(51) Int. Cl.
*G02B 26/08* (2006.01)
*G02B 27/02* (2006.01)
(Continued)

(52) U.S. Cl.
CPC .......... *G02B 27/024* (2013.01); *G02B 17/06* (2013.01); *G02B 27/0093* (2013.01);
(Continued)

(58) Field of Classification Search
CPC .. G02B 27/024; G02B 17/06; G02B 27/0093; G02B 27/017; G02B 27/0977;
(Continued)

(56) References Cited

U.S. PATENT DOCUMENTS

2007/0159599 A1* 7/2007 Yamada ................. A61B 3/113
351/211
2008/0151185 A1 6/2008 Saito
(Continued)

FOREIGN PATENT DOCUMENTS

JP  H6-269412 A  9/1994
JP  H7-79914 A  3/1995
(Continued)

OTHER PUBLICATIONS

Office Action in prior Japanese Application No. 2015-244557 dated Aug. 1, 2017 (4 Sheets, 4 Sheets translation, 8 Sheets total).
(Continued)

*Primary Examiner* — Euncha P Cherry
(74) *Attorney, Agent, or Firm* — Kratz, Quintos & Hanson, LLP

(57) ABSTRACT

An image projection device includes: one light source unit emitting an image light beam, which forms an image, of visible light and a checking light beam of visible light; an optical system projecting the image light beam emitted from emitted from the one light source unit onto a first surface region of an eye of a user to project the image light beam onto a retina of the user, and projecting the checking light beam emitted from the one light source unit onto a second surface region, which is distant from the first surface region, (Continued)

of the eye of the user; a light detector detecting a reflected light that is the checking light beam reflected by the eye of the user; and a controller controlling at least one of the one light source unit and the optical stem based on a detection result of the reflected light by the light detector.

12 Claims, 22 Drawing Sheets

(51) Int. Cl.
*G02B 27/09* (2006.01)
*G02B 17/06* (2006.01)
*G09G 5/00* (2006.01)
*G09G 3/00* (2006.01)
*G09G 3/34* (2006.01)
*H04N 5/74* (2006.01)
*G02B 27/01* (2006.01)
*G02B 27/00* (2006.01)
*G02B 26/10* (2006.01)

(52) U.S. Cl.
CPC ....... *G02B 27/017* (2013.01); *G02B 27/0977* (2013.01); *G09G 3/002* (2013.01); *G09G 3/346* (2013.01); *G09G 5/00* (2013.01); *H04N 5/74* (2013.01); *G02B 26/105* (2013.01); *G02B 2027/0187* (2013.01)

(58) Field of Classification Search
CPC .......... G02B 26/105; G02B 2027/0187; H04N 5/74; G09G 3/002; G09G 3/346; G09G 5/00
See application file for complete search history.

(56) References Cited

U.S. PATENT DOCUMENTS

| | | |
|---|---|---|
| 2009/0231687 A1 | 9/2009 | Yamamoto |
| 2010/0097580 A1 | 4/2010 | Yamamoto |
| 2014/0049831 A1 | 2/2014 | Takeda |

FOREIGN PATENT DOCUMENTS

| | | | |
|---|---|---|---|
| JP | H9-18775 A | 1/1997 |
| JP | H9-163267 A | 6/1997 |
| JP | H11-249064 A | 9/1999 |
| JP | 2000-258724 A | 9/2000 |
| JP | 2002-341239 A | 11/2002 |
| JP | 2003-29198 A | 1/2003 |
| JP | 2004-233425 A | 8/2004 |
| JP | 2006-58505 A | 3/2006 |
| JP | 2008-145701 A | 6/2008 |
| JP | 2008-241822 A | 10/2008 |
| JP | 2009-81529 A | 4/2009 |
| JP | 2009-244869 A | 10/2009 |
| JP | 2010-152443 A | 7/2010 |
| JP | 2010-199789 A | 9/2010 |
| JP | 2011-69978 A | 4/2011 |
| JP | 2011-224213 A | 11/2011 |
| JP | 2013-187794 A | 9/2013 |
| JP | 2014-38239 A | 2/2014 |
| WO | 2009066475 A1 | 5/2009 |

OTHER PUBLICATIONS

International Search Report for International Application No. PCT/JP2016/063002 dated Jul. 19, 2016.

* cited by examiner

IMAGE PROJECTION DEVICE

TECHNICAL FIELD

The present invention relates to an image projection device, and, for example, to an image projection device that directly projects an image onto the retina of the user.

BACKGROUND ART

There have been known image projection devices that utilize Maxwellian view and directly project an image onto the retina of the user as the device that is mounted to the body (the face) of the user and presents the image to the user (for example, a head-mounted display). There have been also known head-mounted displays having functions to authenticate individuals (e.g., Patent Document 1), detect the position of a pupil (e.g., Patent Document 2), detect the opening and closing of the eyelid (e.g., Patent Documents 3 through 5), and track an eye gaze (e.g., Patent Documents 6 and 7) by using the reflected light of the light illuminated to the eye of the user. It is not a head-mounted display, but an eye-gaze tracking device using the light reflected by the eye of the user has been also known (e.g., Patent Documents 8 and 9).

PATENT DOCUMENT

Patent Document 1: Japanese Patent Application Publication No. 2008-241822
Patent Document 2: Japanese Patent Application Publication No. 2011-224213
Patent Document 3: Japanese Patent Application Publication No. 11-249064
Patent Document 4: Japanese Patent Application Publication No. 2009-244869
Patent Document 5: Japanese Patent Application Publication No. 2009-81529
Patent Document 6: Japanese Patent Application Publication No. 2013-187794
Patent Document 7: Japanese Patent Application Publication No. 2000-258724
Patent Document 8: Japanese Patent Application Publication No. 2002-341239
Patent Document 9: Japanese Patent Application Publication No. 6-269412

SUMMARY OF THE INVENTION

Problem to be Solved by the Invention

A light source emitting an image light beam or an optical system projecting the image light beam onto the eye of the user may be controlled based on the reflected light of a checking light beam that has been projected onto the eye of the user while the user is visually recognizing an image. In this case, if an infrared light or the like is used as the checking light beam, a light source emitting the checking light beam needs to be provided separately from the light source emitting the image light beam. This leads to the increase in device size.

The present invention has been made in view of the above problems, and aims to reduce the size of an image projection device capable of controlling a light source or an optical system while the user is visually recognizing an image.

Means for Solving the Problem

The present invention is an image projection device characterized by including: one light source that emits an image light beam and a checking light beam, the image light beam forming an image; an optical system that projects the image light beam emitted from the one light source onto a first surface region of an eye of a user to project the image light beam onto a retina of the user, and projects the checking light beam emitted from the one light source onto a second surface region of the eye of the user, the second surface region being distant from the first surface region; a light detector that detects a reflected light that is the checking light beam reflected by the eye of the user; and a controller that controls at least one of the one light source and the optical system based on a detection result of the reflected light by the light detector.

In the above configuration, the optical system may project the image light beam and the checking light beam onto the eye of the user in a positional relation in which the checking light beam is projected onto an iris of the user when the image light beam passes through a pupil of the user and is projected onto the retina of the user.

In the above configuration, when the light detector does not detect the reflected light, the controller may move projection positions of the image light beam and the checking light beam onto the eye of the user in conjunction with each other by controlling the optical system so that the light detector detects the reflected light.

In the above configuration, the optical system may include: a mirror that scans the image light beam emitted from the one light source and reflects the checking light beam emitted from the one light source; and a projection unit that projects the image light beam and the checking light beam onto the eye of the user in a positional relation in which the checking light beam reflected by the mirror is projected onto the iris of the user when the image light beam scanned by the mirror passes through the pupil of the user and is projected onto the retina of the user, and the controller moves the projection positions of the image light beam and the checking light beam in conjunction with each other by moving a position of the mirror to move an origin of the scan.

In the above configuration, the optical system may include: a mirror that scans the image light beam emitted from the one light source and reflects the checking light beam emitted from the one light source; and a projection unit that projects the image light beam and the checking light beam onto the eye of the user in a positional relation in which the checking light beam reflected by the mirror is projected onto the iris of the user when the image light beam scanned by the mirror passes through the pupil of the user and is projected onto the retina of the user, and the controller moves the projection positions of the image light beam and the checking light beam in conjunction with each other by moving the one light source, the mirror, and the projection unit together.

In the above configuration, the optical system may project a plurality of the checking light beams onto different positions of the eye of the user at different times, and the controller may move the projection positions of the image light beam and the checking light beam in conjunction with each other based on whether the light detector detects the reflected lights of the plurality of the checking light beams at the different times.

In the above configuration, the optical system may project a plurality of the checking light beams onto different positions of the eye of the user, and when the light detector does not detect at least one reflected light of the reflected lights of the plurality of the checking light beams, the controller may move the projection positions of the image light beam and the checking light beam in conjunction with each other so that a projection position of the image light beam moves toward a projection position of the checking light beam corresponding to the reflected light not detected.

In the above configuration, the controller may control the image formed by the image light beam by controlling the one light source based on a detection result of the reflected light by the light detector.

In the above configuration, the optical system may project a plurality of the checking light beams onto different positions of the eye of the user, and the controller may conduct a first control on the image when the light detector does not detect the reflected light of a first checking light beam of the plurality of the checking light beams and conducts a second control on the image when the light detector does not detect the reflected light of a second checking light beam of the plurality of the checking light beams, the second control differing from the first control.

In the above configuration, the optical system may project a plurality of the checking light beams onto different positions of the user, and the controller may conduct a first control on the image when the light detector does not detect the reflected lights of one or some checking light beams of the plurality of the checking light beams, and conducts a second control on the image when the light detector detects none of the reflected lights of the plurality of the checking light beams, the second control differing from the first control.

In the above configuration, the controller may control the one light source to make the image formed by the image light beam after the projection positions of the image light beam and the checking light beam are moved in conjunction with each other different from an image formed by the image light beam before the projection positions of the image light beam and the checking light beam are moved in conjunction with each other.

In the above configuration, the controller may issue a warning to the user by controlling the one light source based on a detection result of the reflected light by the light detector.

In the above configuration, the controller may control the one light source to emit a light for warning to an integrated region including the first surface region and the second surface region of the eye of the user.

In the above configuration, the optical system may include: a mirror that scans the image light beam emitted from the one light source and reflects the checking light beam emitted from the one light source; and a projection unit that projects the image light beam and the checking light beam onto the eye of the user in a positional relation in which the checking light beam reflected by the mirror is projected onto the iris of the user when the image light beam scanned by the mirror passes through the pupil of the user and is projected onto the retina of the user, the mirror may oscillate beyond a range of an image projected onto the retina of the user in a first direction and a second direction intersecting with the first direction, and the one light source may emit the image light beam to the mirror in a period corresponding to the range of the image in oscillation of the mirror and emits the checking light beam to the mirror at time corresponding to an outside of the range of the image.

In the above configuration, the projection unit may include a first region where the image light beam is incident and a second region that is optically discontinuous with the first region and where the checking light beam is incident.

Effects of the Invention

The present invention enables to reduce the size of an image projection device capable of controlling a light source or an optical system while the user is visually recognizing an image.

EMBODIMENTS FOR CARRYING OUT THE INVENTION

Hereinafter, a description will be given of embodiments of the present invention with reference to drawings.

First Embodiment

Figure 1:
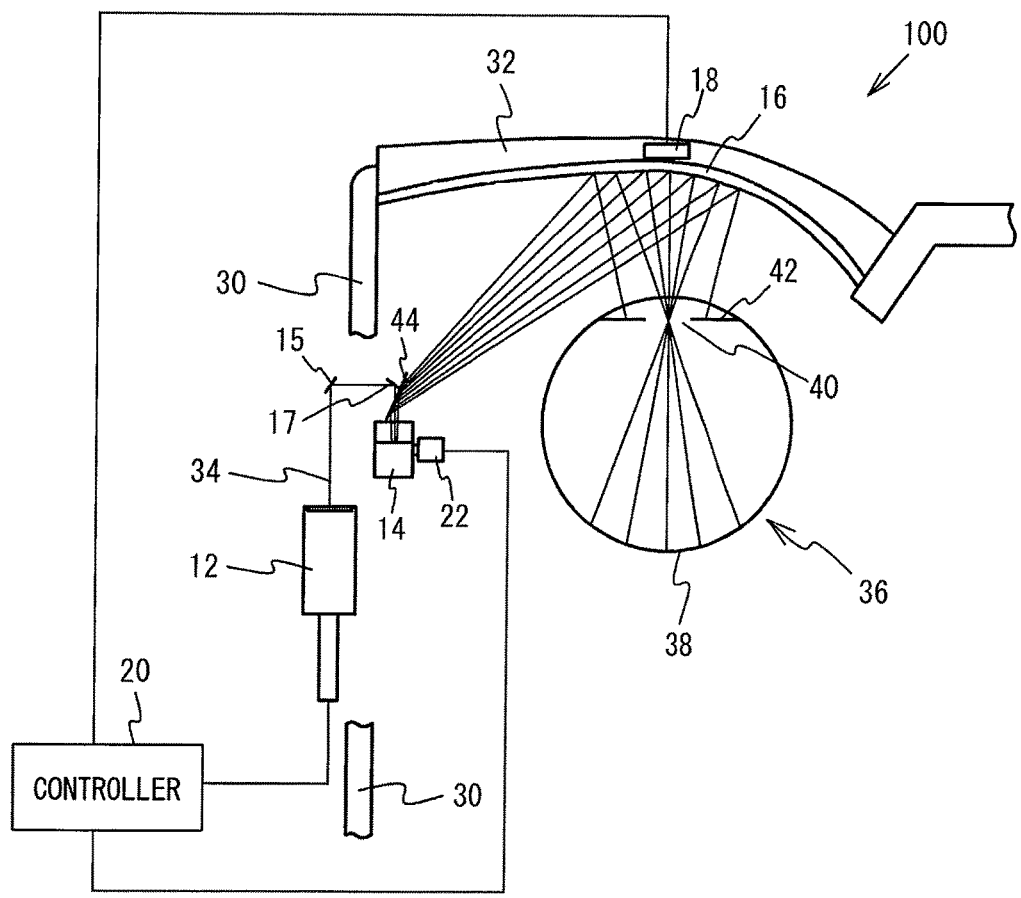
FIG. 1 illustrates an image projection device in accordance with a first embodiment as viewed from above.
Figure 2:
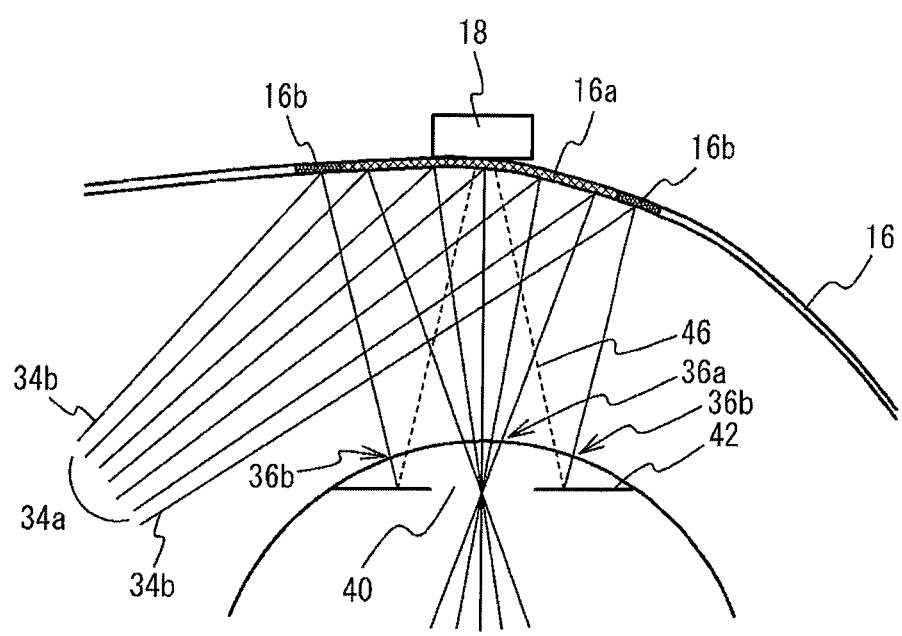
FIG. 2 is an enlarged view of the vicinity of a projection unit in FIG. 1.

FIG. 1 illustrates an image projection device 100 in accordance with a first embodiment as viewed from above. FIG. 2 is an enlarged view of the vicinity of a projection unit 16 in FIG. 1. The image projection device 100 of the first embodiment is a retina projection type head-mounted display using Maxwellian view in which an image light beam for allowing a user to visually recognize an image is directly projected onto a retina 38 of an eyeball 36 of the user.

The image projection device 100 of the first embodiment includes, as illustrated in FIG. 1, a light source 12, a first mirror 14, the projection unit 16, a light detector 18, and a controller 20. The light source 12 is arranged in a temple 30 of a spectacle type frame. The light source 12 emits a light beam 34 of a single wavelength or a plurality of wavelengths under the instruction of the controller 20. The light beam 34 includes an image light beam for projecting an image onto the retina 38 of the eyeball 36 of the user and a checking light beam for detecting at least one of a position of the pupil 40 of the eyeball 36 of the user and the opening and closing of the eyelid of the user. Since the checking light beam is emitted from the light source 12 from which the image light beam is also emitted, the checking light beam is visible light as with the image light beam. The light source 12 emits, for example, a red laser light (wavelength: approximately 610 to 660 nm), a green laser light (wavelength: approximately 515 to 540 nm), and a blue laser light (wavelength: approximately 440 to 480 nm). Non-limiting examples of the light source 12 emitting red, green, and blue laser lights include a light source in which respective laser diode chips of RGB (red/green/blue), a three-color synthesis device, and a micro collimating lens are integrated.

The first mirror 14 is arranged in the temple 30 of the spectacle type frame. The first mirror 14 scans the image light beam emitted from the light source 12 in the horizontal direction and the vertical direction. The first mirror 14 reflects the checking light beam emitted from the light source 12. The first mirror 14 is, for example, a micro electro mechanical system (MEMS) mirror. The light beam 34 emitted from the light source 12 is reflected by, for example, a second mirror 15 and a third mirror 17 and then enter the first mirror 14.

Figure 3A:
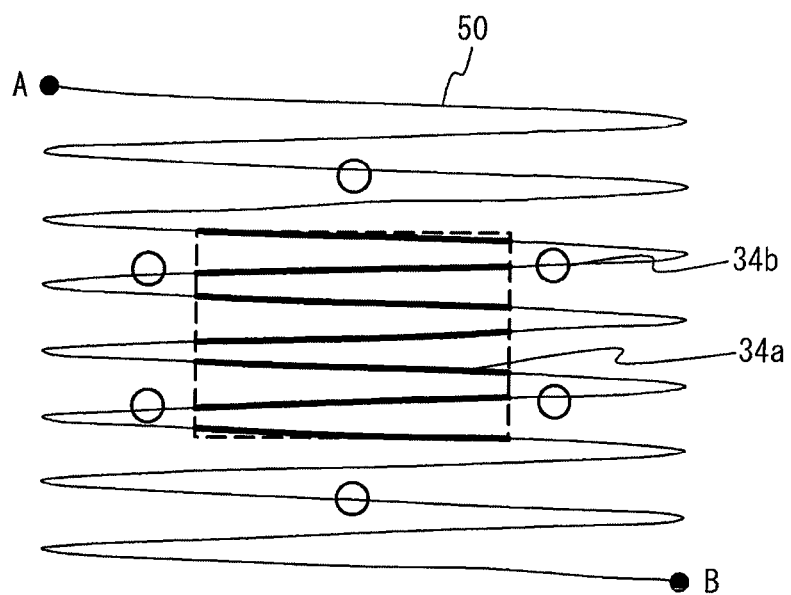
FIG. 3A is a diagram for describing the oscillation of a first mirror, an image light beam, and a checking light beam.

Here, a description will be given of the image light beam and the checking light beam. As a method of projecting an image onto the retina 38 by scanning the image light beam by the first mirror 14, there is a method that displays an image by scanning light at high speed from the upper left to the lower light of the image (for example, raster scan). FIG. 3A is a diagram for describing the oscillation of the first mirror 14, the image light beam, and the checking light beam. As illustrated in FIG. 3A, the first mirror 14 oscillates in the horizontal direction (a first direction) and the vertical direction (a second direction intersecting with the first direction) beyond the range of the image projected onto the retina 38 (the range indicated by a dashed line in FIG. 3A) to scan the image light beam 34a. The oscillation of the first mirror 14 is indicated by reference numeral 50.

Figure 3B:
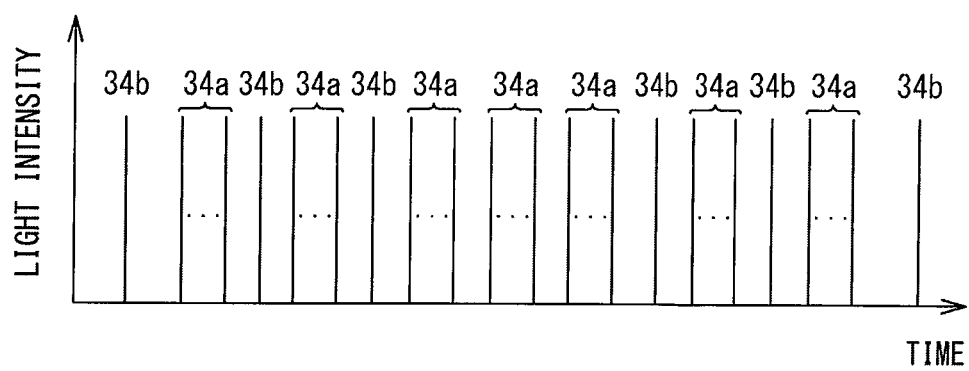
FIG. 3B is a diagram for describing emission timings of the image light beam and the checking light beam from a light source when the first mirror oscillates from point A to point B in FIG. 3A.

When an image is projected onto the retina 38 by scanning the image light beam 34a at the points at which the first mirror 14 swings greatly, image distortion is large. Thus, the image light beam 34a is scanned at the points at which the swing of the first mirror 14 is small. On the other hand, the checking light beam 34b enters the first mirror 14 at the timings when the image light beam 34a is not scanned in the oscillation 50 of the first mirror 14. In other words, in the oscillation 50 of the first mirror 14, the light source 12 emits the image light beam 34a to the first mirror 14 in the period corresponding to the range of the image projected onto the retina 38, and emits the checking light beam 34b to the first mirror 14 at time corresponding to the outside of the range of the image. FIG. 3B is a diagram for describing emission timings of the image light beam 34a and the checking light beam 34b from the light source 12 when the first mirror 14 oscillates from the point A to the point B in FIG. 3A. The light intensity of the checking light beam 34b may be the same as or different from that of the image light beam 34a. It is only required that the light intensity of the checking light beam 34b is enough to detect the reflected light 46 by the light detector 18 described later.

One or a plurality of the checking light beams 34b enter the first mirror 14. FIG. 3A and FIG. 3B illustrate a case where six checking light beams 34b enter the first mirror 14. The checking light beam 34b may be a light beam of a single wavelength, and may be a light beam corresponding to one pixel or several pixels of the image projected onto the retina 38. FIG. 3A illustrates a case where the image light beam 34a is scanned in a rectangular shape, but does not intend to suggest any limitation. The image light beam 34a may be scanned in other shapes such as a trapezoidal shape.

As illustrated in FIG. 1 and FIG. 2, the image light beam 34a scanned by the first mirror 14 and the checking light beam 34b reflected by the first mirror 14 are reflected by a fourth mirror 44 toward a lens 32 of the spectacle type frame. Since the projection unit 16 is arranged on the surface closer to the eyeball 36 of the lens 32, the image light beam 34a scanned by the first mirror 14 and the checking light beam 34b reflected by the first mirror 14 enter the projection unit 16. The projection unit 16 is a half mirror having a free curved surface or a composite structure of a free curved surface and a diffraction surface in a first region 16a where the image light beam 34a is incident. This structure causes the image light beam 34a that has entered the projection unit 16 to be converged near the pupil 40 of the eyeball 36 and then be projected onto the retina 38. Accordingly, the user is able to visually recognize the image formed by the image light beam 34a and visually recognize an external world image through the projection unit 16. On the other hand, the projection unit 16 is a half mirror having a shape optically discontinuous with the first region 16a in second regions 16b where the checking light beam 34b is incident. Accordingly, the checking light beam 34b is projected onto an iris 42 of the eyeball 36 when the image light beam 34a passes through the pupil 40 and is projected onto the retina 38. As described above, when the surface region of the eyeball 36 onto which the image light beam 34a is projected is defined as a first surface region 36a, the checking light beam 34b is projected onto second surface regions 36b distant from the first surface region 36a of the eyeball 36.

Figure 4:
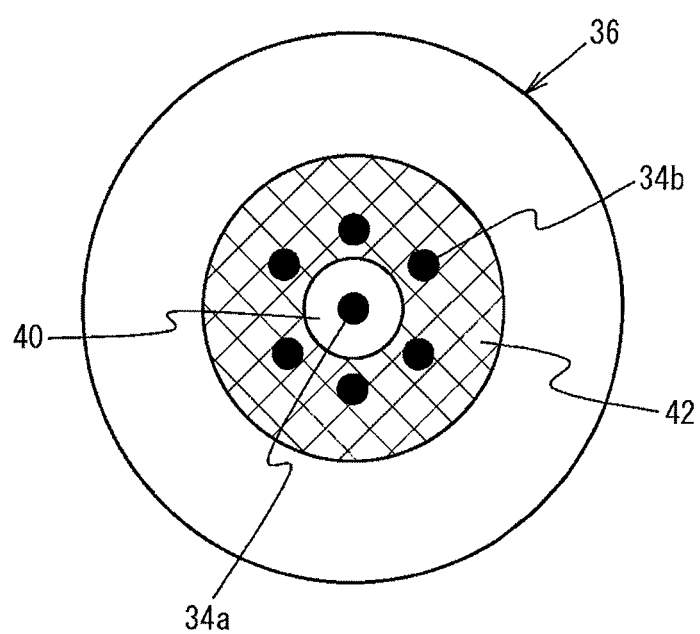
FIG. 4 is a diagram for describing the projection of the image light beam and the checking light beam onto an eyeball.

FIG. 4 is a diagram for describing the projection of the image light beam 34a and the checking light beam 34b onto the eyeball 36. As illustrated in FIG. 4, the checking light beam 34b is projected onto the iris 42 when the image light beam 34a passes through the vicinity of the center of the pupil 40 and then is projected onto the retina 38. Since the second regions 16b of the projection unit 16 are optically discontinuous with the first region 16a, the checking light beam 34b can be projected onto the iris 42 while the image light beam 34a passes through the pupil 40 and is projected onto the retina 38. In addition, the image light beam 34a and the checking light beam 34b are emitted from the light source 12 at predetermined timings with respect to the oscillation of the first mirror 14. That is, the relative emission timings of the image light beam 34a and the checking light beam 34b are fixed. Thus, the image light beam 34a and the checking light beam 34b are projected onto the eyeball 36 while the relative positional relation between the image light beam 34a and the checking light beam 34b are fixed. In addition, as illustrated in FIG. 3A, since a plurality of the checking light beams 34b are the lights reflected at different positions of the oscillation 50 of the first mirror 14, the checking light beams 34b are projected onto the different positions of the iris 42 at different times (different timings). That is, the plurality of the checking light beams 34b are sequentially projected onto different positions of the iris 42.

Figure 5:
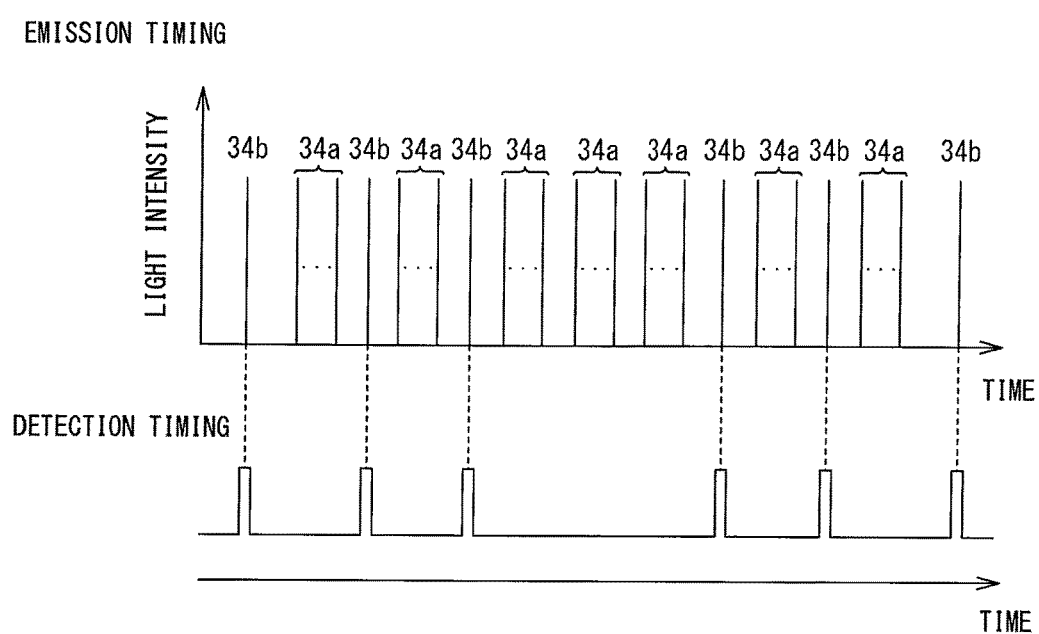
FIG. 5 is a diagram for describing detection timings at which a controller detects a reflected light with use of a light detector.

As illustrated in FIG. 1 and FIG. 2, the light detector 18 is arranged in the frame of the lens 32. The light detector 18 is, for example, a photodetector. The light detector 18 detects a reflected light 46 that is the checking light beam 34b reflected by the iris 42. FIG. 5 is a diagram for describing detection timings at which the controller 20 detects the reflected light 46 with use of the light detector 18. As illustrated in FIG. 5, the controller 20 detects the reflected light 46 by using the light detector 18 at the timing when causing the light source 12 to emit the checking light beam 34b. This operation enables to know which of the reflected lights 46 of the plurality of the checking light beams 34b is not detected. Ranges may be given to the time during which the reflected light 46 is detected taking into consideration the performance of the light detector 18.

FIG. 1 and FIG. 2 illustrate a case where the light detector 18 is located near the center of the lens 32 as an example, but the light detector 18 may be located, for example, near the temple 30 of the lens 32 or the nose pads (not illustrated) as long as it can detect the reflected light 46. Even when a plurality of the checking light beams 34b are projected onto the iris 42, since the plurality of the checking light beams 34b are sequentially projected onto the iris 42 as described above, the light detector 18 can detect the reflected lights 46 of a plurality of the checking light beams 34b.

The controller 20 is provided to an external device (for example, a mobile terminal). The controller 20 includes a central processing unit (CPU), a random access memory (RAM), a read only memory (ROM), and the like, and controls the image projection device 100 according to the program stored in the ROM. The controller 20 causes the light source 12 to emit the image light beam 34a based on input image data and the checking light beam 34b for detecting at least one of the position of the pupil 40 and the opening and closing of the eyelid. Additionally, the controller 20 controls at least one of the optical systems including the light source 12 and the first mirror 14 based on the detection result by the light detector 18. For example, the controller 20 controls the emission of the light beam including the image light beam 34a and/or the checking light beam 34b from the light source 12. For example, the controller 20 drives a position adjustment unit 22 to move the position of the first mirror 14 and move the positions of the third mirror 17 and the fourth mirror 44 in conjunction with the move of the first mirror 14.

Figure 6A:
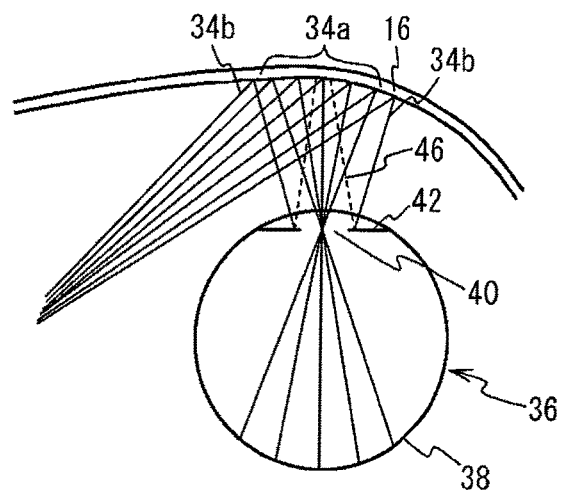
FIG. 6A through FIG. 6C are diagrams for describing the detection of the reflected light using the light detector.
Figure 6B:
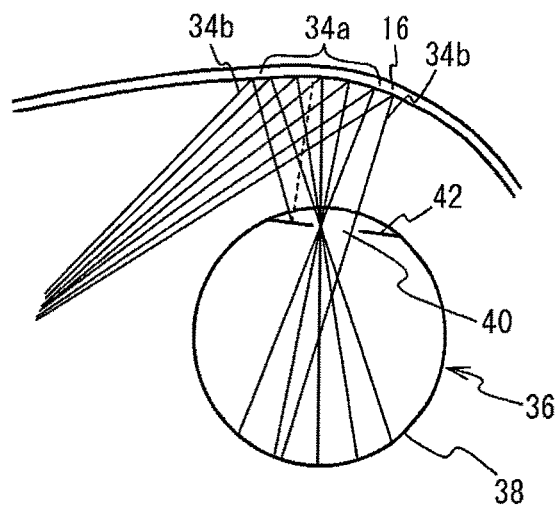
Figure 6C:
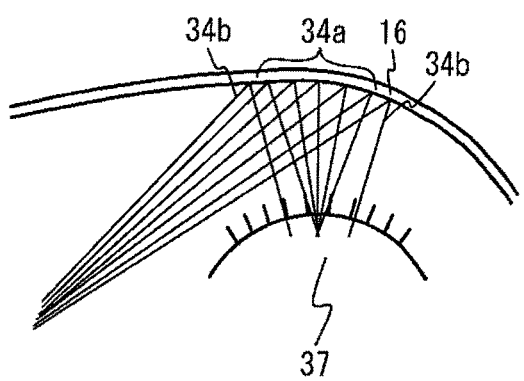

Here, the detection of the reflected light 46 with use of the light detector 18 will be described with FIG. 6A through FIG. 6C. FIG. 6A illustrates a case where the image light beam 34a passes through the pupil 40 and the checking light beam 34b is projected onto the iris 42. FIG. 6B illustrates a case where one or some of the checking light beams 34b pass through the pupil 40 and are projected onto the retina 38 because of the rotation of the eyeball 36. FIG. 6C illustrates a case where the checking light beam 34b is projected onto an eyelid 37 because of the closing of the eyelid 37.

As illustrated in FIG. 6A, when the checking light beam 34b is projected onto the iris 42, relatively large reflected light 46 is generated. On the other hand, when the checking light beam 34b passes through the pupil 40 and is projected onto the retina 38 due to the rotation of the eyeball 36 as illustrated in FIG. 6B or when the checking light beam 34b is projected onto the eyelid 37 due to the closing of the eyelid 37 as illustrated in FIG. 6C, the reflected light 46 is hardly generated. That is, in the case illustrated in FIG. 6A, the light detector 18 detects relatively large reflected light 46, but in the cases illustrated in FIG. 6B and FIG. 6C, the light detector 18 may not detect the reflected light 46. Thus, when the user moves the eyeball 36, the light detector 18 does not detect the reflected lights 46 of one or some checking light beams 34b of the plurality of the checking light beams 34b. When the user has closed the eyelid 37, the light detector 18 detects none of the reflected lights 46 of the plurality of the checking light beams 34b. As clear from the above description, the fact where the light detector 18 does not detect the reflected light 46 means that the light detector 18 does not detect the reflected light 46 having an intensity equal to or greater than a predetermined value.

Figure 7:
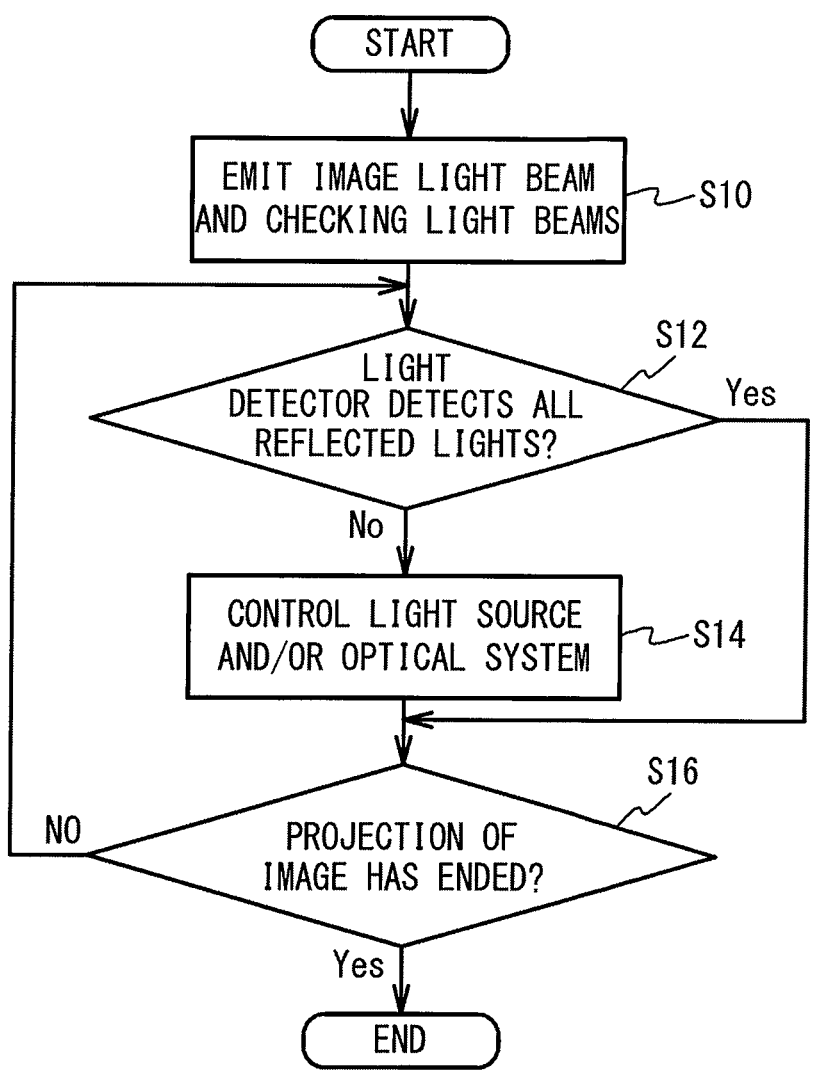
FIG. 7 is a flowchart of an exemplary process by the controller of the image projection device in accordance with the first embodiment.

FIG. 7 is a flowchart of an exemplary process by the controller 20 of the image projection device 100 in accordance with the first embodiment. As illustrated in FIG. 7, at step S10, the controller 20 causes the light source 12 to emit the image light beam 34a based on input image data, and causes the light source 12 to emit a plurality of the checking light beams 34b in association with the emission of the image light beam 34a. As illustrated in FIG. 4, the plurality of the checking light beams 34b are projected onto the different positions of the iris 42 at different times.

Then, at step S12, the controller 20 determines whether the light detector 18 detected the reflected lights 46 at different times at which the plurality of the checking light beams 34b were projected onto the iris 42. That is, as described in FIG. 5, the controller 20 determines whether the reflected light 46 of each of the plurality of the checking light beams 34b was detected at the corresponding time at which each of the plurality of the checking light beams 34b was emitted from the light source 12. For example, when the user has moved the eyeball 36 or closed the eyelid 37, the light detector 18 does not detect the reflected light 46 of at least one checking light beam 34b of the plurality of the checking light beams 34b.

When the light detector 18 does not detect the reflected light 46 of at least one checking light beam 34b of the plurality of the checking light beams 34b (step S12: No), the controller 20 moves to step S14 and controls at least one of the optical systems including the light source 12 and the first mirror 14. Examples of the control of the light source 12 include control of the contents of the image formed by the image light beam 34a (for example, reproduction, stop, pause, or switching to a different image), change of the incident position of at least one of the image light beam 34a and the checking light beam 34b in the oscillation 50 of the first mirror 14, change of the number of the checking light beams 34b, and change of the color or luminance of at least one of the image light beam 34a and the checking light beam 34b. Examples of the control of the optical system include move of the position of at least one of the first mirror 14, the second mirror 15, the third mirror 17, the fourth mirror 44, and the projection unit 16. By moving the positions of these optical system components, the positions at which the image light beam 34a and the checking light beam 34b are illuminated onto the eyeball 36 may be moved, or the focal positions of the image light beam 34a and the checking light beam 34b may be moved. Then, the process moves to step S16. On the other hand, when the light detector 18 detects the reflected lights 46 of all the plurality of the checking light beams 34b (step S12: Yes), the controller 20 skips step S14 and moves to step S16.

At step S16, the controller 20 determines whether the projection of the image has ended. When the projection of the image is not ended, that is, when the image light beam 34a and the checking light beam 34b are being emitted from the light source 12, the determination at step S16 becomes No, and the process moves to step S12. The controller 20 repeats the processes of steps S12 through S16 until the projection of the image ends. On the other hand, when the projection of the image has ended (step S16: Yes), the controller 20 ends the process of FIG. 7.

As described above, in the first embodiment, the image light beam 34a and the checking light beam 34b are emitted from one light source 12. The checking light beam 34b is projected onto the iris 42 when the image light beam 34a passes through the pupil 40 and is then projected onto the retina 38. The controller 20 controls at least one of the optical systems including the light source 12 and the first mirror 14 based on the detection result of the reflected light 46 of the checking light beam 34b by the light detector 18. This configuration reduce the size of the image projection device capable of controlling the light source 12 or the optical system while the user is visually recognizing the image.

Additionally, in the first embodiment, as illustrated in FIG. 3A and FIG. 3B, the first mirror 14 oscillates beyond the range of the image projected onto the retina 38 of the user in the horizontal direction and the vertical direction. The light source 12 emits the image light beam 34a to the first mirror 14 in a period corresponding to the range of the image in the oscillation of the first mirror 14, and emits the checking light beam 34b to the first mirror 14 at time corresponding to the outside of the range of the image. This configuration enables to scan the image light beam 34a and to reflect the checking light beam 34b by effectively using the oscillation of the first mirror 14.

Additionally, in the first embodiment, as illustrated in FIG. 2, the projection unit 16 includes the first region 16a where the image light beam 34a is incident and the second regions 16b that are optically discontinuous with the first region 16a and where the checking light beam 34b is incident. This configuration enables to easily achieve that the image light beam 34a passes through a pupil 40 and is projected onto the retina 38 while the checking light beam 34b is projected onto the iris 42.

The first embodiment describes a case where the image light beam 34a and the checking light beam 34b are projected onto the eyeball 36 in a positional relation in which the checking light beam 34b is projected onto the iris 42 when the image light beam 34a passes through the pupil 40 and is projected onto the retina 38 as an example, but does not intend to suggest any limitation. Other positional relations may be employed as long as the second surface regions 36b where the checking light beam 34b is projected onto the eyeball 36 are distant from the first surface region 36a where the image light beam 34a is projected onto the eyeball 36. However, since relatively large reflected light 46 is generated when the checking light beam 34b is projected onto the iris 42, the checking light beam 34b is preferably projected onto the iris 42 when the image light beam 34a passes through the pupil 40 and is projected onto the retina 38.

The first embodiment describes a case where a plurality of the checking light beams 34b are projected onto the eyeball 36, but does not intend to suggest any limitation. One checking light beam 34b may be projected onto the eyeball 36.

Second Embodiment

Figure 8A:
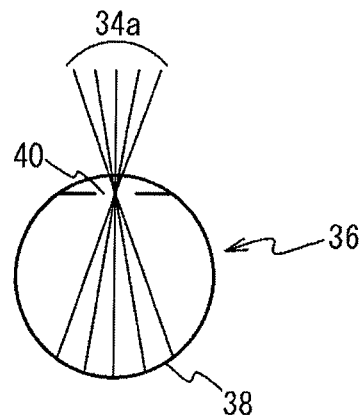
FIG. 8A through FIG. 8C are diagrams for describing the projection of the image light beam onto a retina with respect to movements of the eyeball.
Figure 8B:
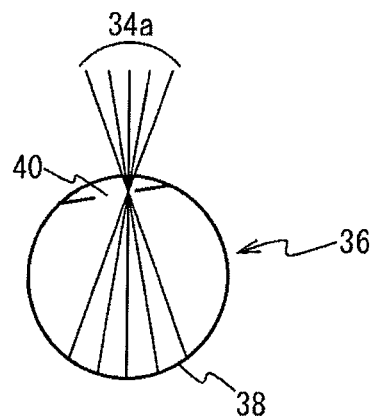
Figure 8C:
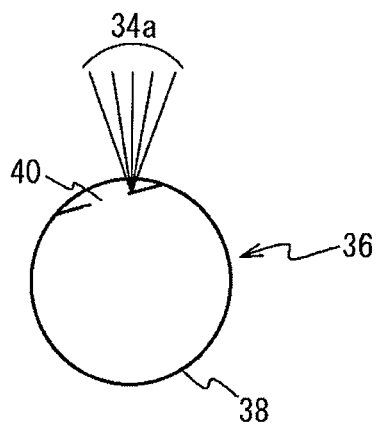

In the image projection device that directly projects an image onto the retina of the user, unless the image light beam passes through the pupil, the image is not projected onto the retina, and the user cannot see the image. This will be described with FIG. 8A through FIG. 8C. FIG. 8A through FIG. 8C are diagrams for describing the projection of the image light beam 34a onto the retina 38 with respect to movements of the eyeball 36. FIG. 8A illustrates a case where the eyeball 36 faces front, FIG. 8B illustrates a case where the eyeball 36 rotates to the left from the front, and FIG. 8C illustrates a case where the eyeball 36 further rotates to the left.

As illustrated in FIG. 8A, it is assumed that the image light beam 34a converges near the center of the pupil 40 and is then projected onto the retina 38 when the eyeball 36 faces front. In this case, when the eyeball 36 rotates to the left as illustrated in FIG. 8B, the image light beam 34a converges near the edge of the pupil 40 and is projected onto the retina 38. When the eyeball 36 further rotates to the left as illustrated in FIG. 8C, the image light beam 34a cannot pass through the pupil 40 and thus, is not projected onto the retina 38.

As described above, when the eyeball 36 moves, the image light beam 34a may not pass through the pupil 40. For example, since the position of the pupil and the move of the eyeball in the rotational direction vary between different individuals, the image light beam 34a may not pass through the pupil 40 depending on the user. Thus, the second embodiment describes the image projection device that inhibits an image from being not projected onto the retina of the user by controlling the optical system based on the detection result of the reflected light 46 of the checking light beam 34b by the light detector 18.

As described in FIG. 6A and FIG. 6B, relatively large reflected light 46 is generated when the checking light beam 34b is projected onto the iris 42, but the reflected light 46 is hardly generated when the checking light beam 34b passes through the pupil 40 and is then projected onto the retina 38 because of the rotation of the eyeball 36. When the checking light beam 34b passes through the pupil 40 and is projected onto the retina 38, the image light beam 34a is assumed to be in a state where a lack of the image may occur, such as a state where the image light beam 34a passes through the vicinity of the edge of the pupil 40 or does not pass through the pupil 40. Thus, in the second embodiment, when the light detector 18 does not detect the reflected light 46, the state where a lack of the image may occur is assumed, and control for reducing a lack of the image is conducted.

An image projection device 200 in accordance with the second embodiment is the same as or similar to that of the first embodiment illustrated in FIG. 1, and the description thereof is thus omitted. As described above, the controller 20 drives the position adjustment unit 22 based on the detection result of the reflected light 46 of the checking light beam 34*b* by the light detector 18 to move the position of the first mirror 14 and move the positions of the third mirror 17 and the fourth mirror 44 in conjunction with the move of the first mirror 14. This control moves the origin of the scanning of the image light beam 34*a*. As the origin of the scanning of the image light beam 34*a* moves, the projection positions of the image light beam 34*a* and the checking light beam 34*b* onto the eyeball 36 are moved. This will be described with FIG. 9A through FIG. 10.

Figure 9A:
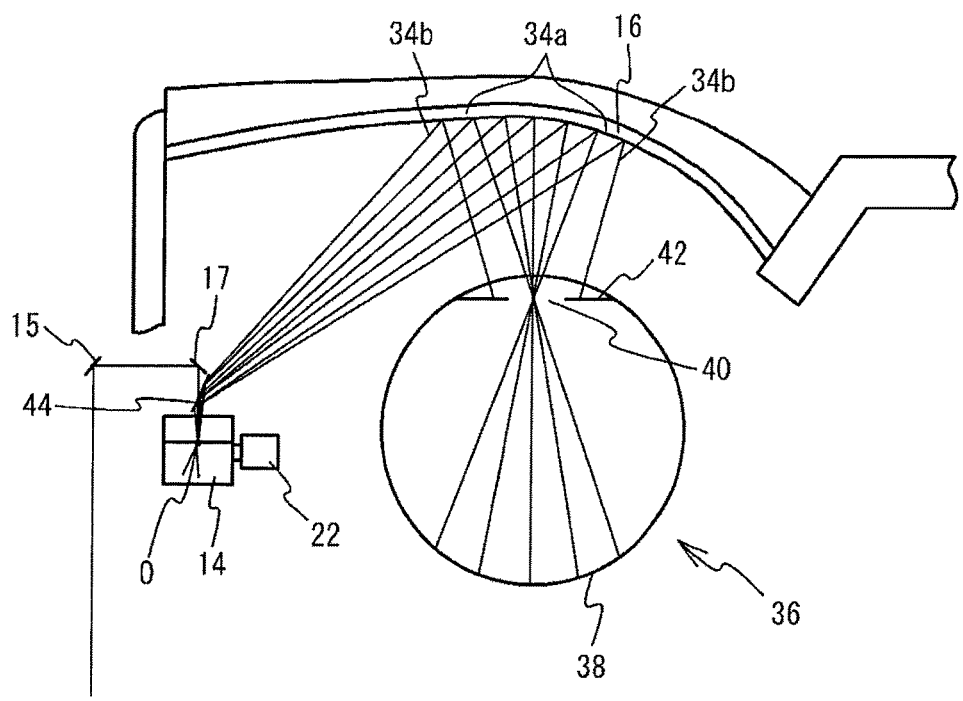
FIG. 9A and FIG. 9B are diagrams (No. 1) for describing the change of projection positions of the image light beam and the checking light beam onto the eyeball.
Figure 9B:
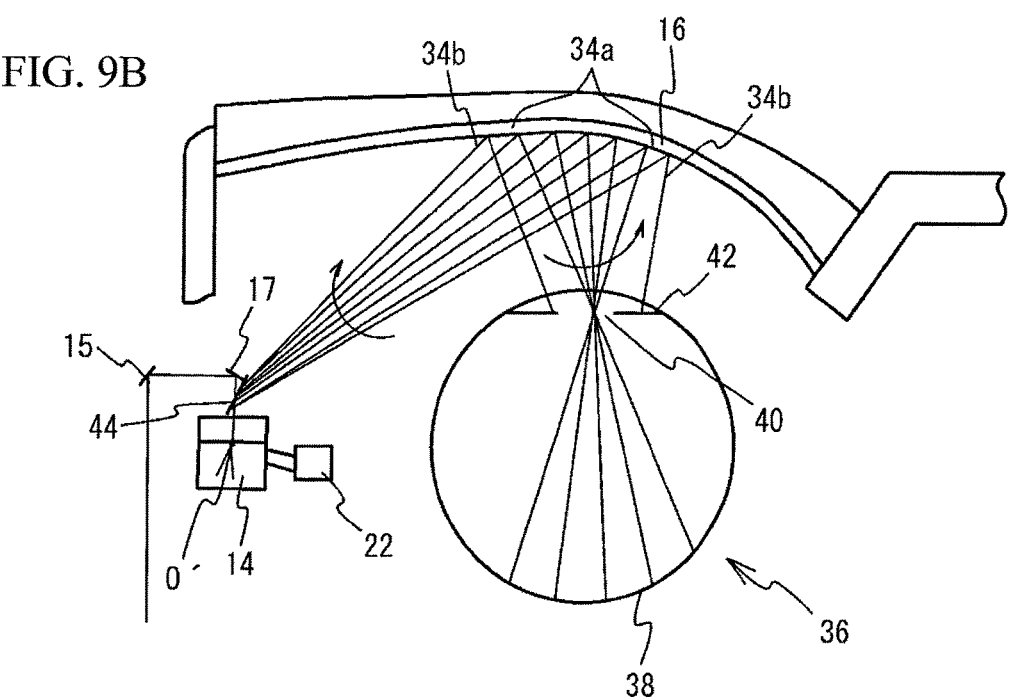
Figure 10:
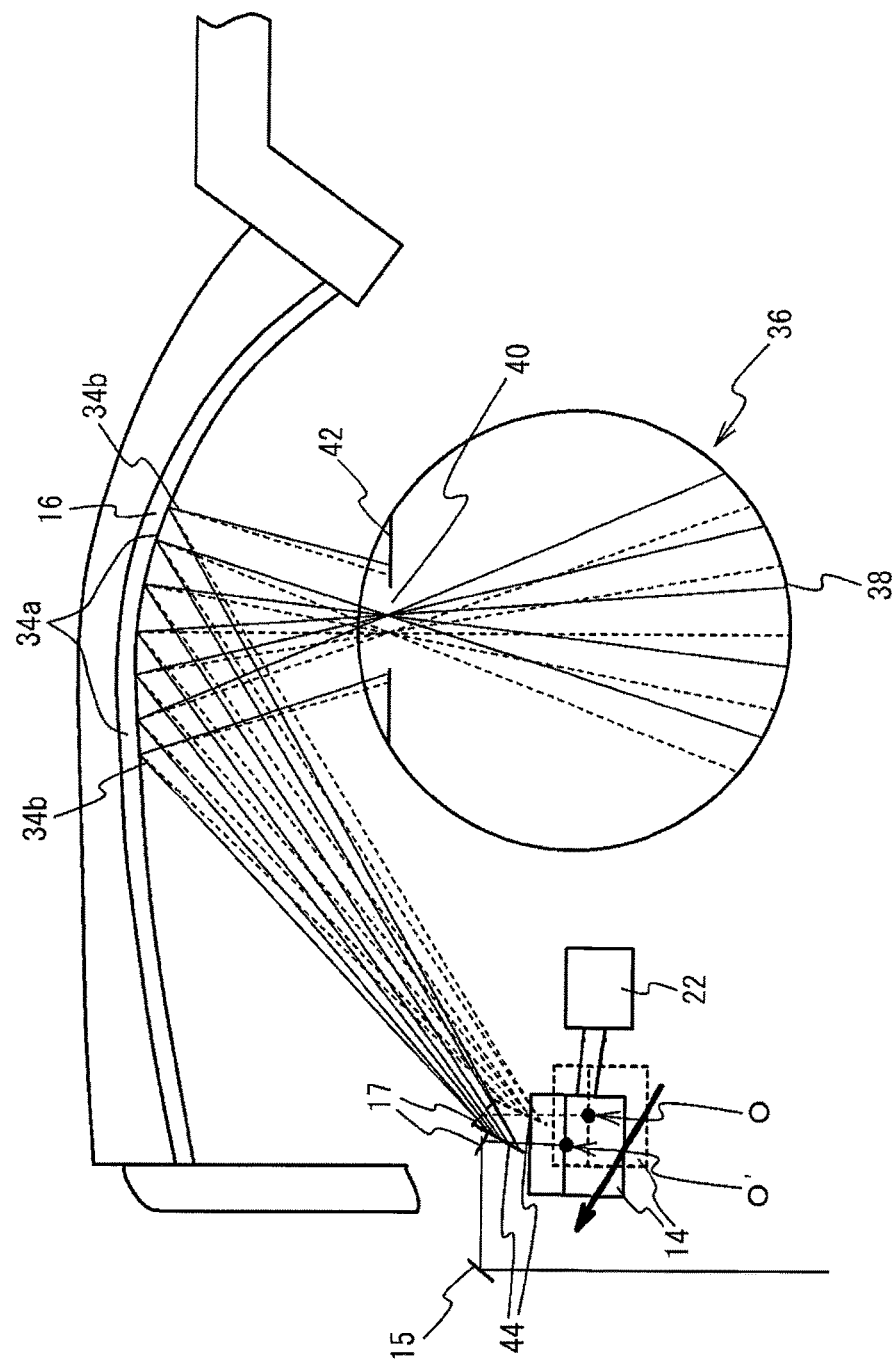
FIG. 10 is a diagram (No. 2) for describing the change of projection positions of the image light beam and the checking light beam onto the eyeball.

FIG. 9A through FIG. 10 are diagrams for describing the change of the projection positions of the image light beam 34*a* and the checking light beam 34*b* onto the eyeball 36. FIG. 10 illustrates the state combining the states of FIG. 9A and FIG. 9B, and indicates the state of FIG. 9A by dotted lines and the state of FIG. 9B by solid lines.

The dotted lines in FIG. 9A and FIG. 10 indicate a case where the image light beam 34*a* passes through the vicinity of the center of the pupil 40. When the position adjustment unit 22 is driven to move the position of the first mirror 14 and move the positions of the third mirror 17 and the fourth mirror 44 in conjunction with the move of the first mirror 14 as indicated by the solid lines in FIG. 9B and FIG. 10 from the state indicated by the dotted lines in FIG. 9A and FIG. 10, the origin of the scanning of the image light beam 34*a* is moved from 0 to 0'. Even when the origin of the scanning moves, the incident position of the image light beam 34*a* corresponding to the center part of the image projected onto the retina 38 into the projection unit 16 is configured to be hardly changed. This is to reduce the deterioration of the quality of the image projected onto the retina 38 and the change of the incident position of the checking light beam 34*b* to the projection unit 16.

The move of the origin of the scanning of the image light beam 34*a* described above changes the incident angles of the image light beam 34*a* and the checking light beam 34*b* to the projection unit 16, resulting in the move of the projection positions of the image light beam 34*a* and the checking light beam 34*b* onto the eyeball 36. The image light beam 34*a* and the checking light beam 34*b* move in conjunction with each other while the relative positional relation of the projection positions onto the eyeball 36 remains fixed. For example, the state where the image light beam 34*a* passes through the vicinity of the center of the pupil 40 as indicated by the dotted lines in FIG. 9A and FIG. 10 changes to the state where the image light beam 34*a* passes through a part closer to the edge than the center of the pupil 40 as indicated by the solid lines in FIG. 9B and FIG. 10. As described above, the projection positions of the image light beam 34*a* and the checking light beam 34*b* onto the eyeball 36 can be moved in conjunction with each other by moving the origin of the scanning of the image light beam 34*a* by causing the position adjustment unit 22 to move the position of the first mirror 14 and to move the positions of the third mirror 17 and the fourth mirror 44 in conjunction with the move of the first mirror 14. The first mirror 14 preferably moves in arc, but may linearly move in the direction indicated by the arrow in FIG. 10 or the direction perpendicular to the plane of paper in FIG. 10 (the direction perpendicular to the arrow). In this case, a dual-axis actuator (e.g., an ultrasonic actuator) capable of biaxially moving the first mirror 14, the third mirror 17, and the fourth mirror 44 may be used as the position adjustment unit 22.

Figure 11:
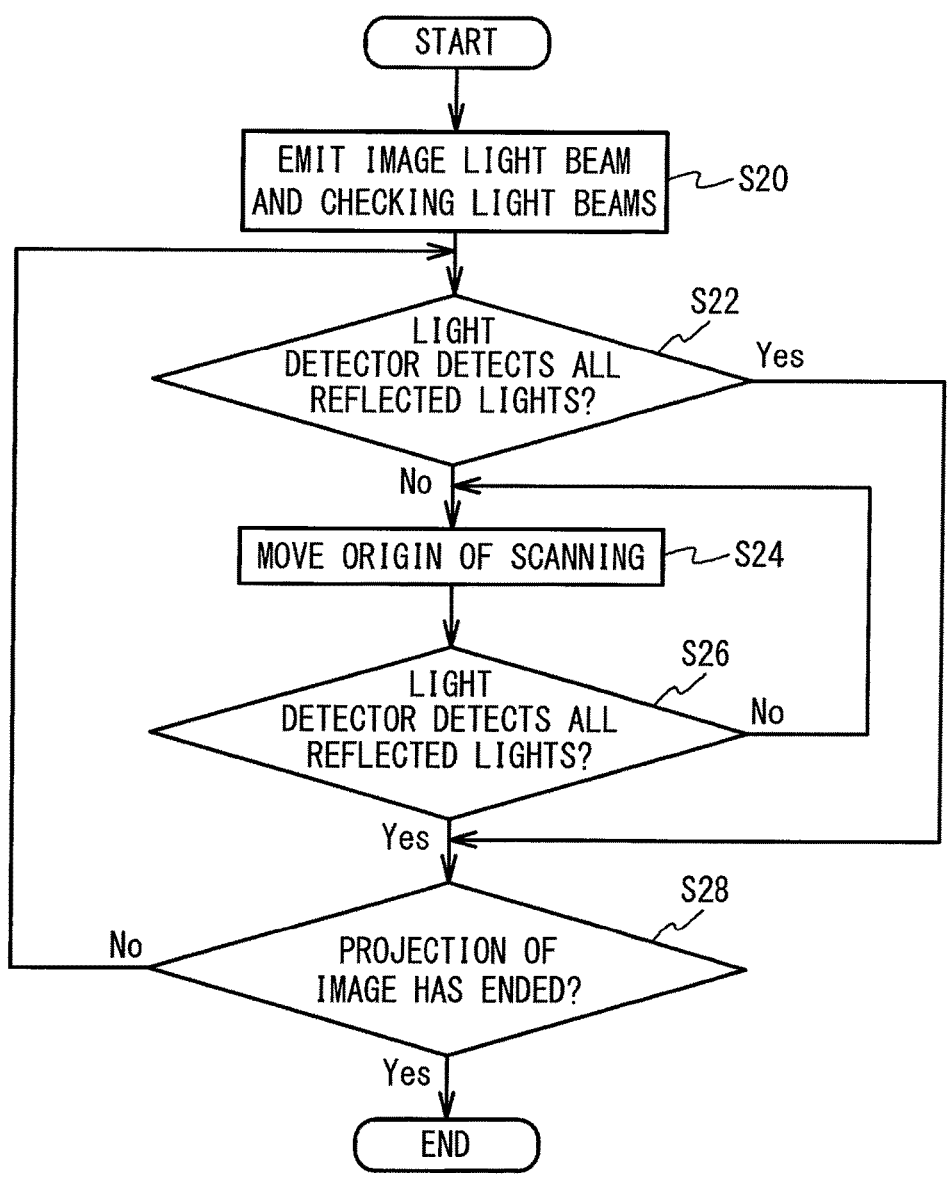
FIG. 11 is a flowchart of an exemplary process by the controller of an image projection device in accordance with a second embodiment.
Figure 12A:
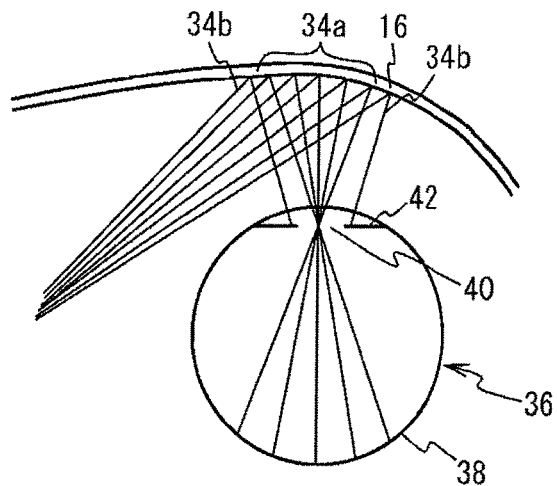
FIG. 12A through FIG. 12C are diagrams for describing that a lack of an image is reduced by the process of FIG. 11.
Figure 12B:
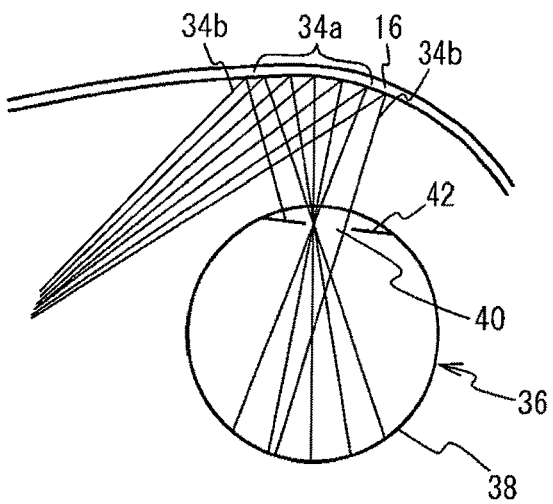
Figure 12C:
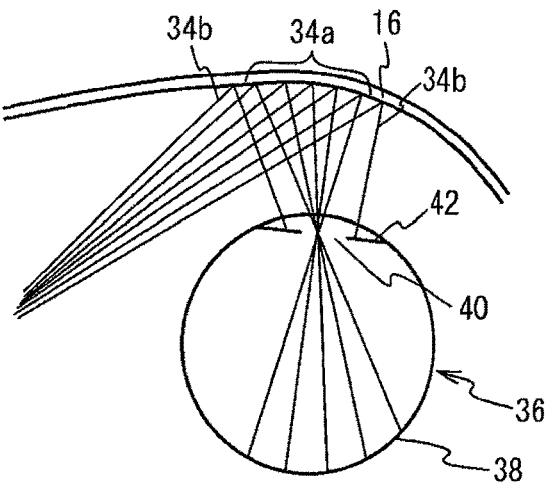

FIG. 11 is a flowchart of an exemplary process by the controller 20 of the image projection device 200 in accordance with the second embodiment. FIG. 12A through FIG. 12C are diagrams for describing that a lack of the image is reduced by the process of FIG. 11. As illustrated in FIG. 11, at step S20, the controller 20 causes the light source 12 to emit the image light beam 34*a* based on input image data, and causes the light source 12 to emit a plurality of the checking light beams 34*b* in association with the emission of the image light beam 34*a*. As described in FIG. 4, the plurality of the checking light beams 34*b* are projected onto different positions of the iris 42 at different times.

Then, at step S22, the controller 20 determines whether the light detector 18 detected the reflected lights 46 at different times at which the plurality of the checking light beams 34*b* were projected onto the iris 42. That is, as described in FIG. 5, the controller 20 determines whether the light detector 18 detected the reflected light 46 of each of the plurality of the checking light beams 34*b* at the corresponding time at which each of the plurality of the checking light beams 34*b* was emitted from the light source 12. When the light detector 18 detects the reflected lights 46 of all the plurality of the checking light beams 34*b*, it is assumed that all the plurality of the checking light beams 34*b* enter the iris 42 and the image light beam 34*a* passes through the vicinity of the center of the pupil 40 as illustrated in FIG. 12A. Thus, when the light detector 18 detects the reflected lights 46 of all the plurality of the checking light beams 34*b*, the adjustment of the projection position of the image light beam 34*a* onto the eyeball 36 is unnecessary, and thus the determination at step S22 becomes Yes, and the process moves to step S28.

On the other hand, when the light detector 18 does not detect the reflected light 46 of at least one of the plurality of the checking light beams 34*b*, it is assumed that at least one checking light beam 34*b* does not enter the iris 42 and passes through the pupil 40 and the image light beam 34*a* passes through the vicinity of the edge of the pupil 40 as illustrated in FIG. 12B. That is, the state where a lack of the image may occur is assumed. Thus, when the light detector 18 does not detect the reflected light 46 of at least one of the plurality of the checking light beams 34*b* (step S22: No), the process moves to step S24 to adjust the projection position of the image light beam 34*a* onto the eyeball 36.

At step S24, the controller 20 moves the origin of the scanning of the image light beam 34*a* by driving the position adjustment unit 22 to move the position of the first mirror 14 and move the positions of the third mirror 17 and the fourth mirror 44 in conjunction with the move of the first mirror 14. As described in FIG. 9A through FIG. 10, the move of the origin of the scanning of the image light beam 34*a* enables to move the projection positions of the image light beam 34*a* and the checking light beam 34*b* onto the eyeball 36 in conjunction with each other. At this time, the controller 20 moves the origin of the scanning of the image light beam 34*a* so that the projection position of the image light beam 34*a* moves toward the projection position of the checking light beam 34*b* corresponding to the reflected light 46 not detected by the light detector 18.

Then, at step S26, the controller 20 determines whether the light detector 18 detects the reflected lights 46 of all the plurality of the checking light beams 34*b*. When the light detector 18 has not still detected the reflected light 46 of at least one of the plurality of the checking light beams 34*b*

(step S26: No), the process returns to step S24. The controller 20 repeats the processes of steps S24 and S26 until the light detector 18 detects the reflected lights 46 of all the plurality of the checking light beams 34b.

On the other hand, when the light detector 18 detects the reflected lights 46 of all the plurality of the checking light beams 34b, it is assumed that all the plurality of the checking light beams 34b enter the iris 42 and the image light beam 34a passes through the vicinity of the center of the pupil 40 as illustrated in FIG. 12C. Thus, when the light detector 18 detects the reflected lights 46 of all the plurality of the checking light beams 34b (step S26: Yes), the adjustment of the projection position of the image light beam 34a onto the eyeball 36 is ended, and the process moves to step S28.

At step S28, the controller 20 executes the same process as or the similar process to that of step S16 in FIG. 7 in the first embodiment.

As described above, in the second embodiment, when the light detector 18 does not detect the reflected light 46 of the checking light beam 34b, the controller 20 controls the optical system to move the projection positions of the image light beam 34a and the checking light beam 34b onto the eyeball 36 in conjunction with each other so that the light detector 18 detects the reflected light 46. This control inhibits the image light beam 34a from not passing through the pupil 40, and as a result, inhibits an image from being not projected onto the retina 38.

In addition, to inhibit the image light beam 34a from not passing through the pupil 40, the controller 20 preferably moves the projection positions of the image light beam 34a and the checking light beam 34b onto the eyeball 36 in conjunction with each other while fixing the relative positional relation between the projection positions of the image light beam 34a and the checking light beam 34b onto the eyeball 36. Even when the relative positional relation between the projection positions of the image light beam s34a and the checking light beam 34b onto the eyeball 36 slightly shifts, it is only required that the projection positions of the image light beam 34a and the checking light beam 34b onto the eyeball 36 move in conjunction with each other.

Additionally, in the second embodiment, the controller 20 moves the projection positions of the image light beam 34a and the checking light beam 34b onto the eyeball 36 in conjunction with each other by moving the position of the first mirror 14 to move the origin of the scanning of the image light beam 34a. This configuration enables to easily move the projection positions of the image light beam 34a and the checking light beam 34b in conjunction with each other.

Additionally, in the second embodiment, a plurality of the checking light beams 34b are projected onto different positions of the iris 42 at different times. The controller 20 moves the projection positions of the image light beam 34a and the checking light beam 34b onto the eyeball 36 based on whether the light detector 18 detects the reflected lights 46 of a plurality of the checking light beams 34b at different times. This control effectively inhibits the image light beam 34a from not passing through the pupil 40.

Additionally, in the second embodiment, when the light detector 18 does not detect at least one reflected light 46 of the reflected lights 46 of a plurality of the checking light beams 34b, the controller 20 moves the projection positions of the image light beam 34a and the checking light beam 34b onto the eyeball 36 in conjunction with each other so that the projection position of the image light beam 34a moves toward the projection position of the checking light beam 34b corresponding to the reflected light 46 not detected. This control enables to efficiently adjust the projection position of the image light beam 34a to the pupil 40.

Figure 13:
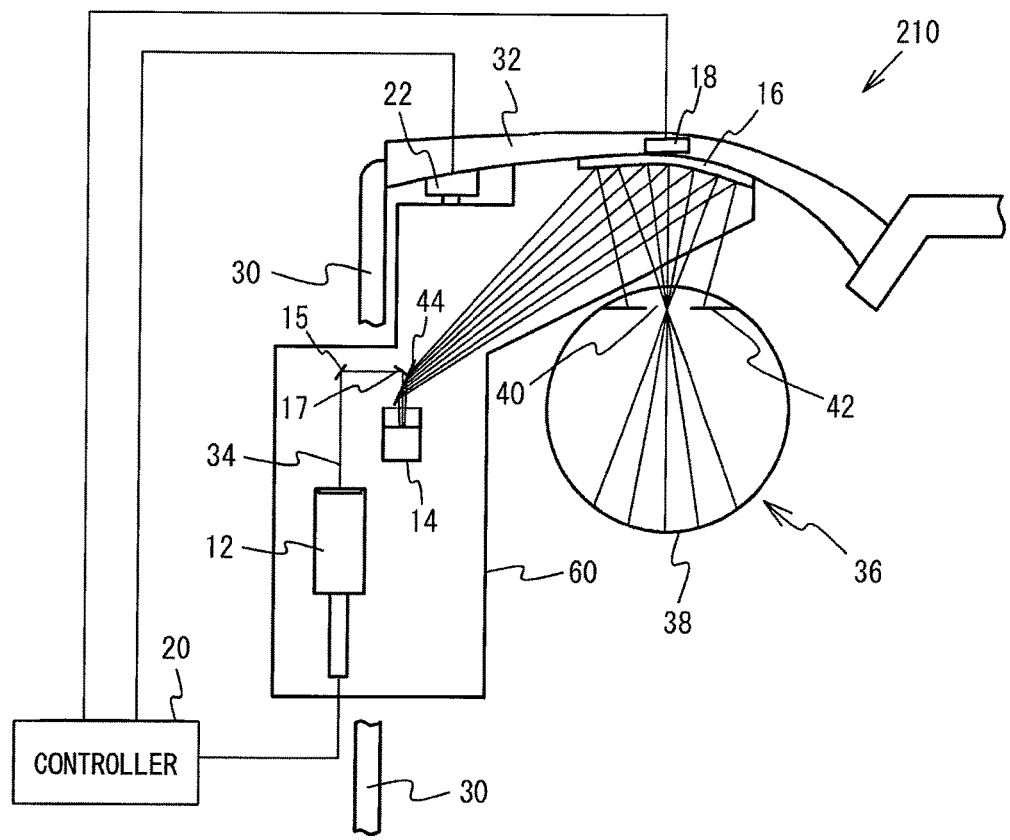
FIG. 13 illustrates an image projection device in accordance with a first variation of the second embodiment as viewed from above.

FIG. 13 illustrates an image projection device 210 in accordance with a first variation of the second embodiment as viewed from above. In the image projection device 210 of the first variation of the second embodiment, the light source 12, the first mirror 14, the second mirror 15, the third mirror 17, the fourth mirror 44, and the projection unit 16 are located in one chassis 60 as illustrated in FIG. 13. The position adjustment unit 22 is provided to, for example, the lens 32 of a spectacle type frame, and moves the position of the chassis 60. The position adjustment unit 22 moves the chassis 60 in the horizontal direction and the vertical direction with respect to the eyeball 36. Other configurations are the same as or similar to those of the first embodiment illustrated in FIG. 1, and the description thereof is thus omitted.

Figure 14A:
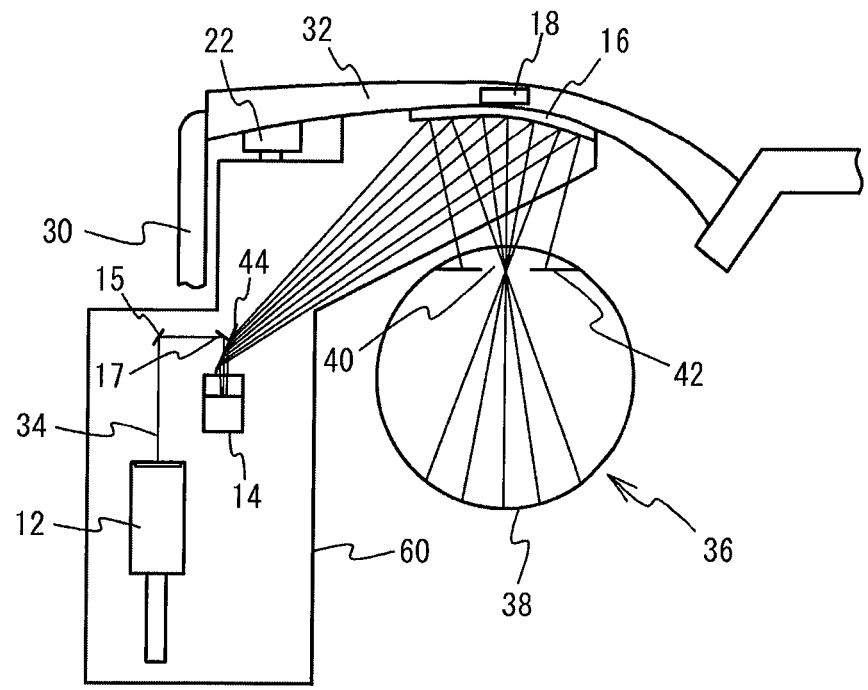
FIG. 14A and FIG. 14B are diagrams for describing projection positions of the image light beam and the checking light beam onto the eyeball in the case of the image projection device in accordance with the first variation of the second embodiment.
Figure 14B:
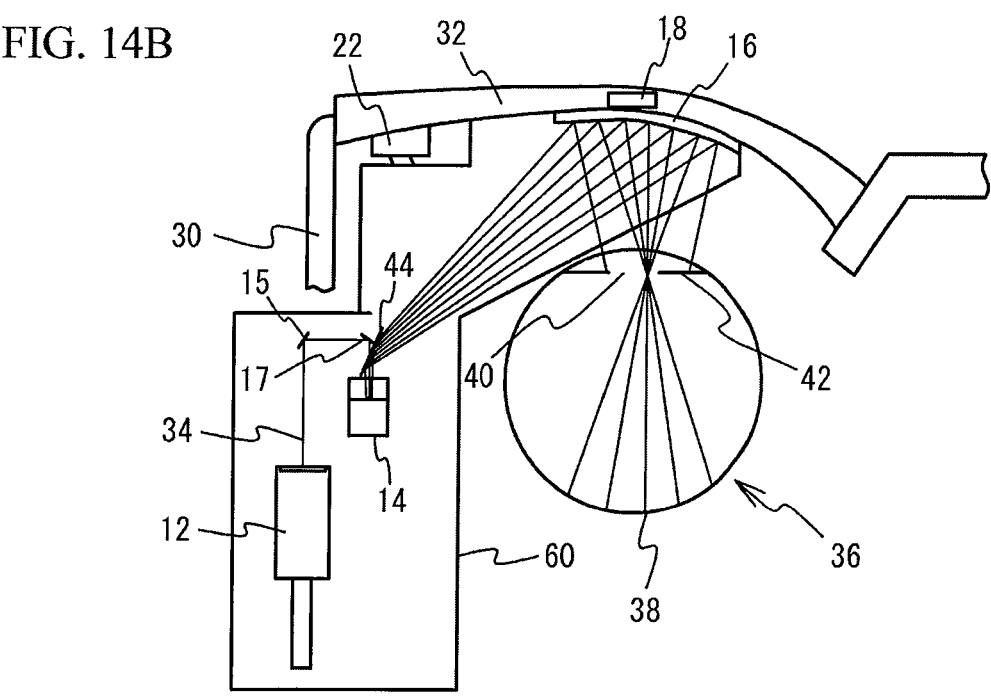

FIG. 14A and FIG. 14B are diagrams for describing the change of the projection positions of the image light beam 34a and the checking light beam 34b onto the eyeball 36 in the image projection device 210 in accordance with the first variation of the second embodiment. FIG. 14A illustrates a case where the image light beam 34a passes through the vicinity of the center of the pupil 40. The projection positions of the image light beam 34a and the checking light beam 34b onto the eyeball 36 can be moved by driving the position adjustment unit 22 to move the position of the chassis 60 from the state of FIG. 14A as illustrated in FIG. 14B. As described above, by moving the position of the chassis 60 (i.e., moves the light source 12, the first mirror 14, and the projection unit 16 together) by the position adjustment unit 22, the projection positions of the image light beam 34a and the checking light beam 34b onto the eyeball 36 can be moved in conjunction with each other.

Figure 15:
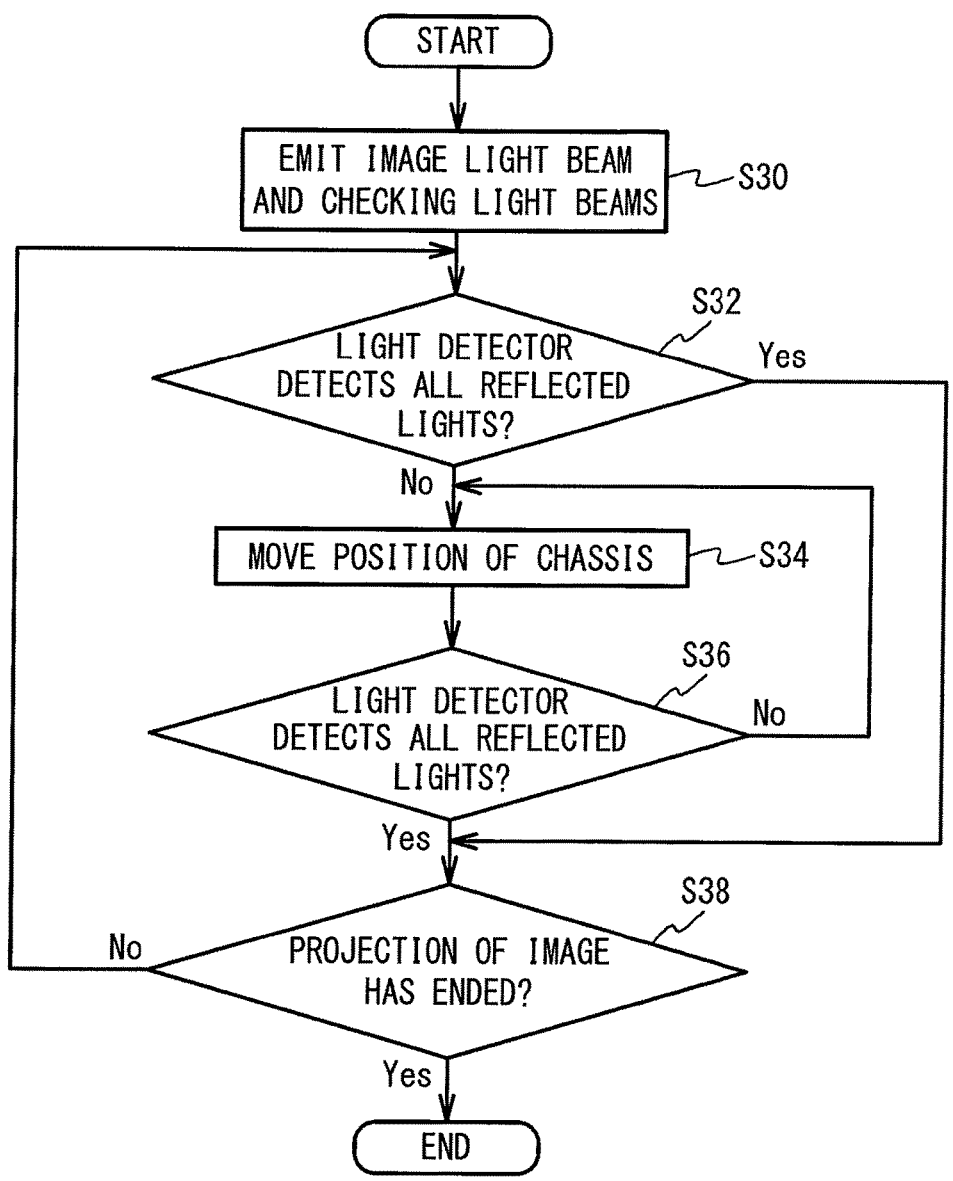
FIG. 15 is a flowchart of an exemplary process by the controller of an image projection device in accordance with the first variation of the second embodiment.

FIG. 15 is a flowchart of an exemplary process by the controller 20 of the image projection device 210 in accordance with the first variation of the second embodiment. As illustrated in FIG. 15, at steps S30 and S32, the controller 20 executes processes that are the same as or similar to those of steps S20 and S22 in FIG. 11 in the second embodiment.

Then, at step S34, the controller 20 drives the position adjustment unit 22 to move the position of the chassis 60. As described in FIG. 14A and FIG. 14B, the move of the position of the chassis 60 enables to move the projection positions of the image light beam 34a and the checking light beam 34b onto the eyeball 36 in conjunction with each other. Thereafter, at steps S36 and S38, the controller 20 executes processes that are the same as or similar to those of steps S26 and S28 in FIG. 11 in the second embodiment.

As described above, in the first variation of the second embodiment, the controller 20 moves the projection positions of the image light beam 34a and the checking light beam 34b onto the eyeball 36 in conjunction with each other by moving the light source 12, the first mirror 14, and the projection unit 16 together. Even in such a case, the image light beam 34a is inhibited from not passing through the pupil 40. Additionally, the first variation of the second embodiment inhibits the image light beam 34a from entering the retina 38 obliquely.

In the first variation of the second embodiment, the lens 32 of the spectacle type frame may move together with the light source 12, the first mirror 14, and the projection unit 16.

In the second embodiment and the first variation of the second embodiment, when the light detector 18 does not detect a plurality of the reflected lights 46, the controller 20 may calculate the middle position of the projection positions of a plurality of the checking light beams 34b corresponding to the plurality of the reflected lights 46 not detected, and move the projection positions of the image light beam 34a and the checking light beam 34b toward the middle position.

The second embodiment and the first variation of the second embodiment describe a case where a plurality of the checking light beams 34b are projected onto the eyeball 36 as an example, but one checking light beam 34b may be projected onto the eyeball 36.

In the second embodiment and the first variation of the second embodiment, the image light beam 34a and the checking light beam 34b are preferably in a positional relation in which the image light beam 34a passes through the vicinity of the edge of the pupil 40 when the checking light beam 34b does not enter the iris 42 and passes through the pupil 40 as illustrated in FIG. 12B. This configuration reduces a lack of the image.

Third Embodiment

Figure 16:
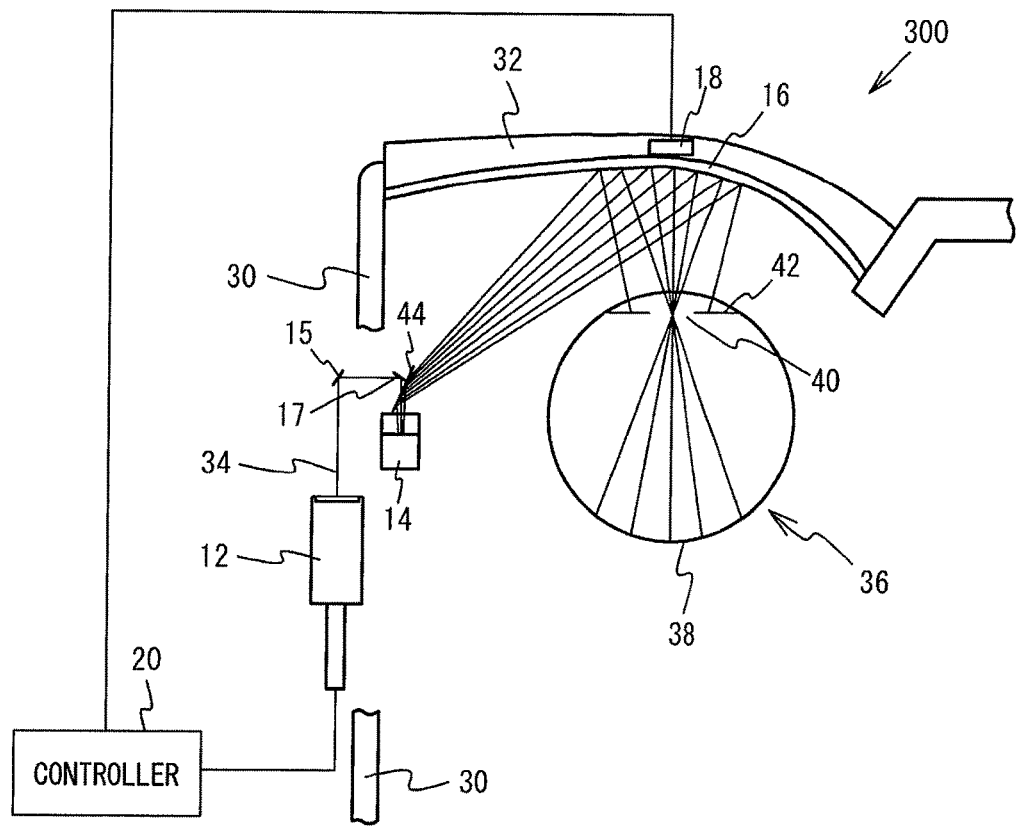
FIG. 16 illustrates an image projection device in accordance with a third embodiment as viewed from above.

A third embodiment is an exemplary image projection device that issues a warning when the user is in a dozing state. The dozing state in the third embodiment includes a state where the user is likely to become in a dozing state in addition to a state where the user is considered as being in a dozing state. FIG. 16 illustrates an image projection device 300 in accordance with the third embodiment as viewed from above. As illustrated in FIG. 16, the image projection device 300 in accordance with the third embodiment differs from the image projection device 100 of the first embodiment in that the position adjustment unit 22 is not provided. Other structures are the same as or similar to those of the first embodiment illustrated in FIG. 1, and the description thereof is thus omitted.

Figure 17:
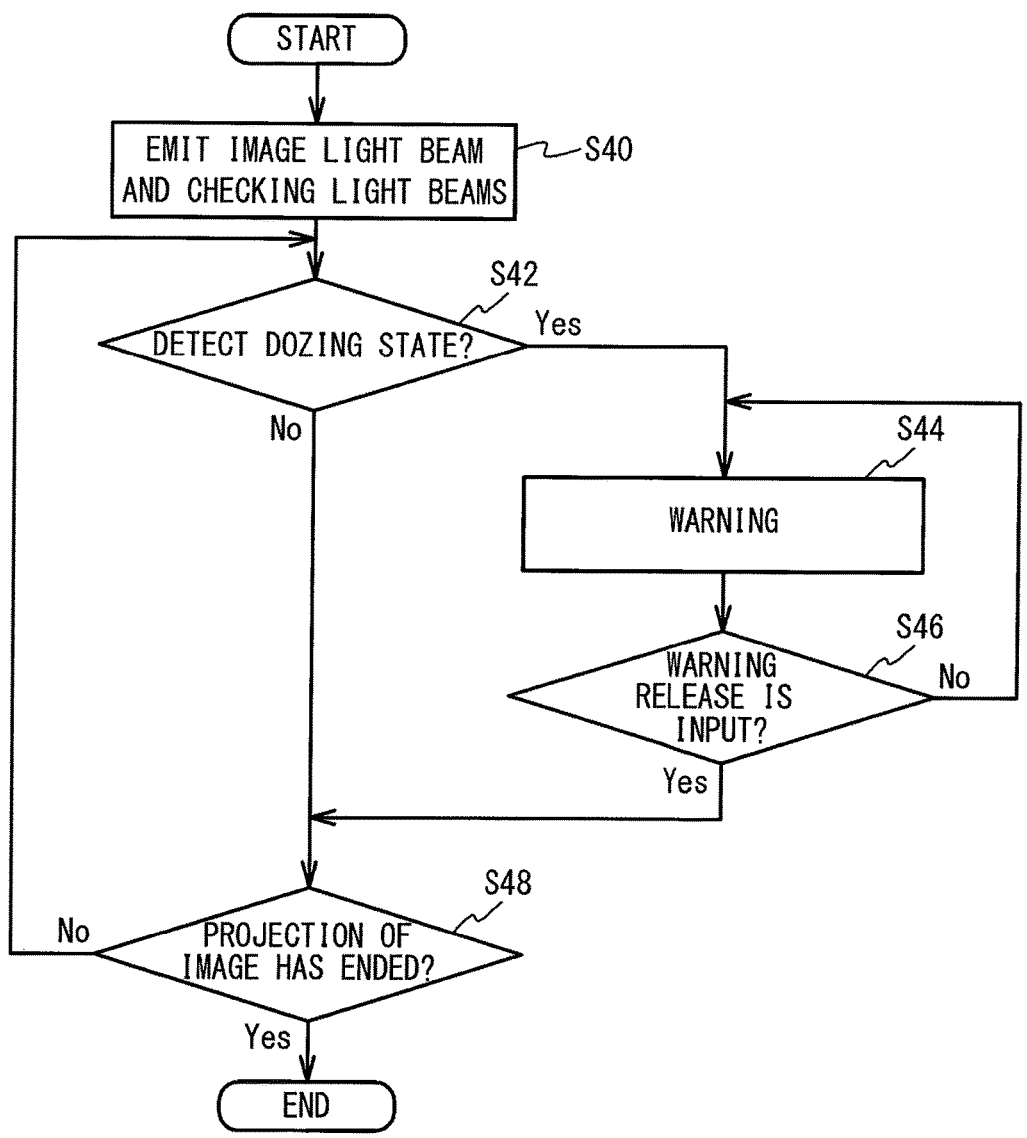
FIG. 17 is a flowchart of an exemplary process by the controller of the image projection device in accordance with the third embodiment.

FIG. 17 is a flowchart of an exemplary process by the controller 20 of the image projection device 300 of the third embodiment. As illustrated in FIG. 17, at step S40, the controller 20 causes the light source 12 to emit the image light beam 34a based on input image data, and causes the light source 12 to emit a plurality of the checking light beams 34b in association with the emission of the image light beam 34a.

Then, at step S42, the controller 20 detects whether the user is in a dozing state based on the detection result of the reflected lights 46 of the checking light beams 34b by the light detector 18. Here, the detection of a dozing state will be described with flowcharts of FIG. 18A through FIG. 18C.

Figure 18A:
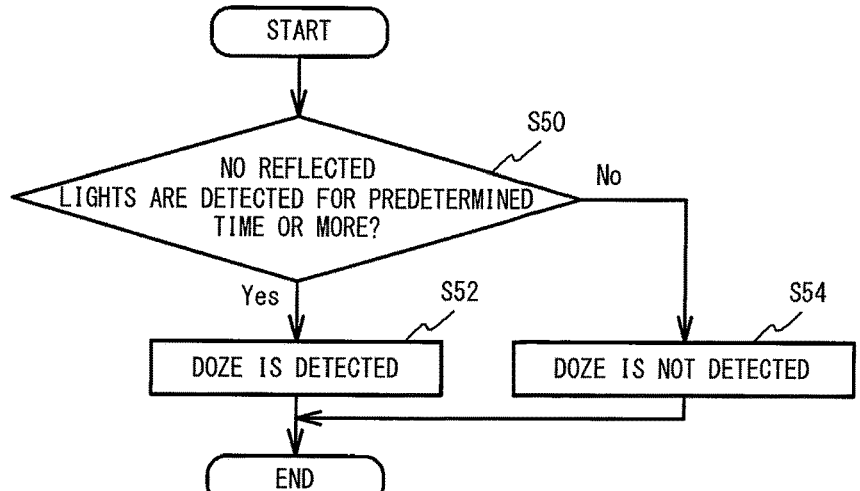
FIG. 18A through FIG. 18C are flowcharts of detection of a dozing state.

As illustrated in FIG. 18A, at step S50, the controller 20 determines whether the light detector 18 has detected none of the reflected lights 46 of the plurality of the checking light beams 34b for a predetermined time or more. As described in FIG. 6C, when the eyelid 37 is closed, the light detector 18 detects none of the reflected lights 46 of the plurality of the checking light beams 34b. Thus, when the light detector 18 has detected none of the reflected lights 46 for the predetermined time or more (step S50: Yes), the controller 20 moves to step S52 and detects that the user is in a dozing state. On the other hand, when the light detector 18 has detected the reflected light 46 of any of the plurality of the checking light beams 34b within the predetermined time, the determination at step S50 becomes No, the process moves to step S54, and the controller 20 detects that the user is not in a dozing state. It is only required to set as the predetermined time the time with which it is possible to determine whether the eyelid 37 is closed because the user becomes in a dozing state or whether the eyelid 37 is temporarily closed by other reasons.

Figure 18B:
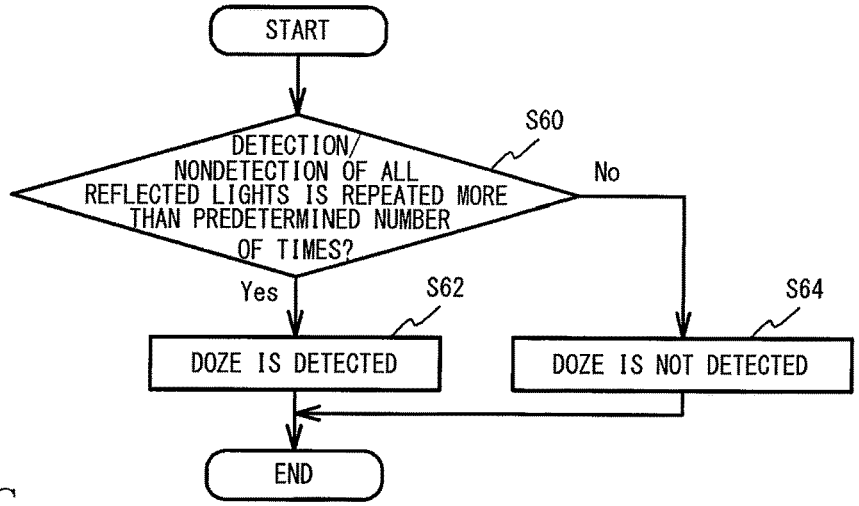

As illustrated in FIG. 18B, at step S60, the controller 20 determines whether the light detector 18 repeats detection/nondetection of the reflected lights 46 of all the plurality of the checking light beams 34b more than a predetermined number of times per a predetermined time. When the user falls in a dozing state, the number of openings and closings of the eyelid 37 increases. Thus, when the light detector 18 repeats detection/nondetection of all the reflected lights 46 more than the predetermined number of times per the predetermined time (step S60: Yes), the controller 20 moves to step S62, and detects that the user is in a dozing state. On the other hand, when the light detector 18 does not repeat detection/nondetection of all the reflected lights 46 more than the predetermined number of times, the determination at step S60 becomes No, the process moves to step S64, and the controller 20 detects that the user is not in a dozing state. It is only required to set, as the predetermined time and the predetermined number of times, the time and the number of times with which it is possible to determine whether the user falls in a dozing state.

Figure 18C:
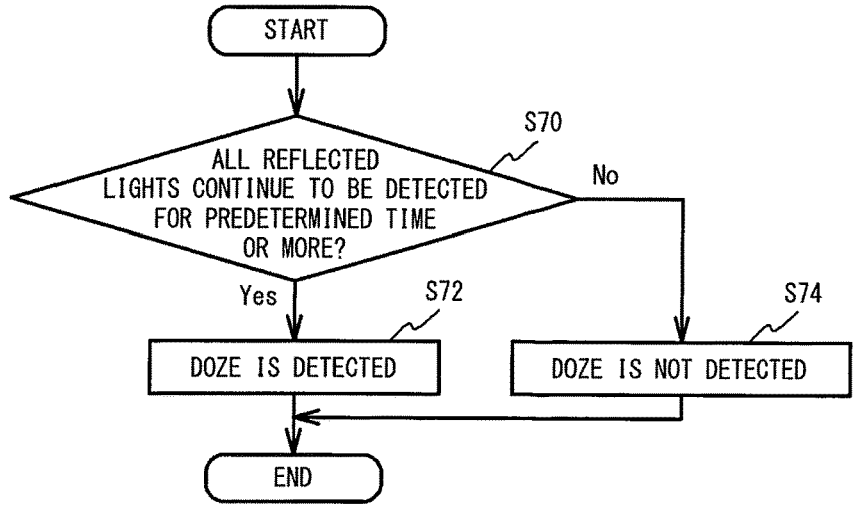

As illustrated in FIG. 18C, at step S70, the controller 20 determines whether the light detector 18 continues to detect the reflected lights 46 of all the plurality of the checking light beams 34b for a predetermined time or more. As described in FIG. 6A and FIG. 6B, when all the reflected lights 46 continue to be detected, it means that the eyeball 36 is not moving. When the eyeball 36 has not moved for the predetermined time or more, the user may lose consciousness and be in nearly a dozing state. Thus, when the light detector 18 continues to detect all the reflected lights 46 for the predetermined time or more (step S70: Yes), the controller 20 moves to step S72 and detects that the user is in a dozing state. On the other hand, when the light detector 18 does not detect at least one of the reflected lights 46 within the predetermined time, the determination at step S70 becomes No, the process moves to step S74, and the controller 20 detects that the user is not in a dozing state.

The detection of a dozing state at step S42 in FIG. 17 may be conducted by at least one of the methods of FIG. 18A through FIG. 18C, or by combining several methods. Alternatively, a dozing state may be detected by other methods.

Figure 19A:
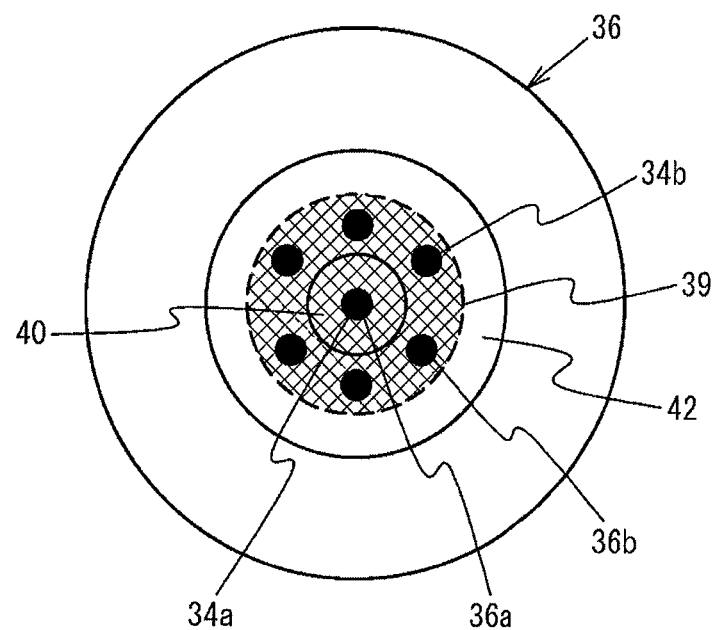
FIG. 19A and FIG. 19B illustrate an example of a warning.

When a dozing state is detected (step S42: Yes), the controller 20 moves to step S44, and controls the light source 12 to issue a warning to the user for preventing dozing. Here, an example of the warning is described with FIG. 19A and FIG. 19B. As illustrated in FIG. 19A, the controller 20 may cause the light source 12 to emit a light for warning to an integrated region 39 including the first surface region 36a in which the image light beam 34a is projected onto the eyeball 36 and a plurality of the second surface regions 36b in which a plurality of the checking light beams 34b are projected onto the eyeball 36. By increasing the intensity of the light for warning, the user can recognize the light through the eyelid 37. However, if the light intensity is too large, the eye may be damaged when the user opens the eyelid 37. Thus, the intensity of the light for warning is preferably set taking into consideration above things. For example, the intensity of the light for warning may be the maximum light intensity used for the image light beam 34a. In addition, the light for warning may be continuously illuminated to the integrated region 39, or may be caused to blink by repeating illumination and non-illumination.

Figure 19B:
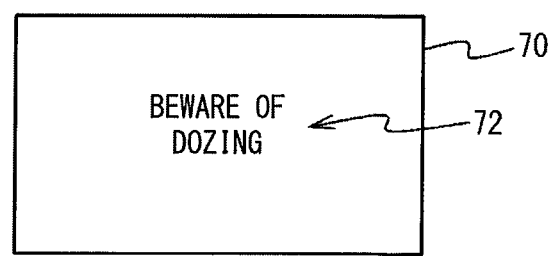

As illustrated in FIG. 19B, the controller 20 may display a warning 72 such as "Beware of dozing" on an image 70 formed by the image light beam 34a. The warning 72 may be displayed in any location within the image 70, but is preferably displayed in the center part of the image 70 to make the user aware of it.

The way of issuing a warning may be changed depending on which step a dozing state is detected at in FIG. 18A through FIG. 18C. For example, when a dozing state is detected while the eyelid 37 is closed as described in FIG. 18A, the light for warning is preferably illuminated to the region 39 as described in FIG. 19A. When a dozing state is detected while the eyelid 37 is opened even a little as described in FIG. 18B and FIG. 18C, the light for warning may be illuminated to the region 39 as described in FIG. 19A or the warning 72 may be displayed as described in FIG. 19B.

As described in FIG. 17, after issuing a warning, the controller 20 moves to step S46, and determines whether the user inputs a measure to lift the warning. When the measure to lift the warning is not input (step S46: No), the determination at step S46 becomes No, and the controller 20 moves to step S44 and continues to issue the warning. On the other hand, when the measure to lift the warning is input (step S46: Yes), the determination at step S46 becomes Yes, and the process moves to step S48. The user may input the measure to lift the warning by operating, for example, the external device (e.g., a mobile terminal) equipped with the controller 20.

At step S48, the controller 20 executes a process that is the same as or similar to that of step S16 in FIG. 7 in the first embodiment.

As described above, in the third embodiment, the controller 20 issues a warning to the user by controlling the light source 12 based on the detection result of the reflected lights 46 by the light detector 18. This configuration inhibits the user from falling asleep, for example.

Additionally, in the third embodiment, as illustrated in FIG. 19A, the controller 20 controls the light source 12 to emit the light for warning to the integrated region 39 including the first surface region 36a and the second surface regions 36b of the eyeball 36. This configuration allows the light for warning to be projected onto the retina 38 through the eyelid 37 irrespective of which direction the pupil 40 faces. To make the user arise from sleep, the light for warning is preferably white light, but may be other lights as long as it is visible light.

In the third embodiment, the controller 20 may detect the time for which all the reflected lights 46 are not detected in FIG. 18A, the number of detection/nondetection of all the reflected lights 46 in FIG. 18B, and the time for which all the reflected lights 46 continue to be detected in FIG. 18C, and may change the light for warning depending on these detection results. For example, the intensity of the light for warning may be set as low when the time for which all the reflected lights 46 are not detected or the time for which all the reflected lights 46 continue to be detected is less than $t_1$ seconds, may be set as middle when $t_1$ or greater and less than $t_2$ seconds, and may be set as high when $t_2$ seconds or greater. For example, the intensity of the light for warning may be decreased when the number of detection/nondetection of all the reflected lights 46 is less than $n_1$, may be set to the middle level when $n_1$ or greater and less than $n_2$, and may be set to large when $n_2$ or greater. That is, the intensity of the warning may be changed according to the state of dozing.

In the third embodiment, the controller 20 may control the light source 12 to issue a warning by an image and may control a sound source (not illustrated) to issue a warning with a sound. Also in the case of emitting warning sound, as with the case of the image, the loudness of the warning sound may be changed according to the state of dozing.

The third embodiment may be combined with the control of the move of the projection positions of the image light beam 34a and the checking light beam 34b in conjunction with each other described in the second embodiment. In the third embodiment, it is detected whether the user is in a dozing state based on the detection result of the reflected lights 46 by the light detector 18, but this does not intend to suggest any limitation. A warning may be issued based on the detection result of the reflected lights 46 by the light detector 18.

The third embodiment describes a case where a plurality of the checking light beams 34b are projected onto the eyeball 36, but one checking light beam 34b may be projected onto the eyeball 36.

Fourth Embodiment

A fourth embodiment is an exemplary image projection device that controls the image to be displayed in accordance with movements of the eyeball 36 or the eyelid 37 of the user. An image projection device 400 in accordance with the fourth embodiment is the same as or similar to that of the third embodiment illustrated in FIG. 16, and the description thereof is thus omitted.

Figure 20:
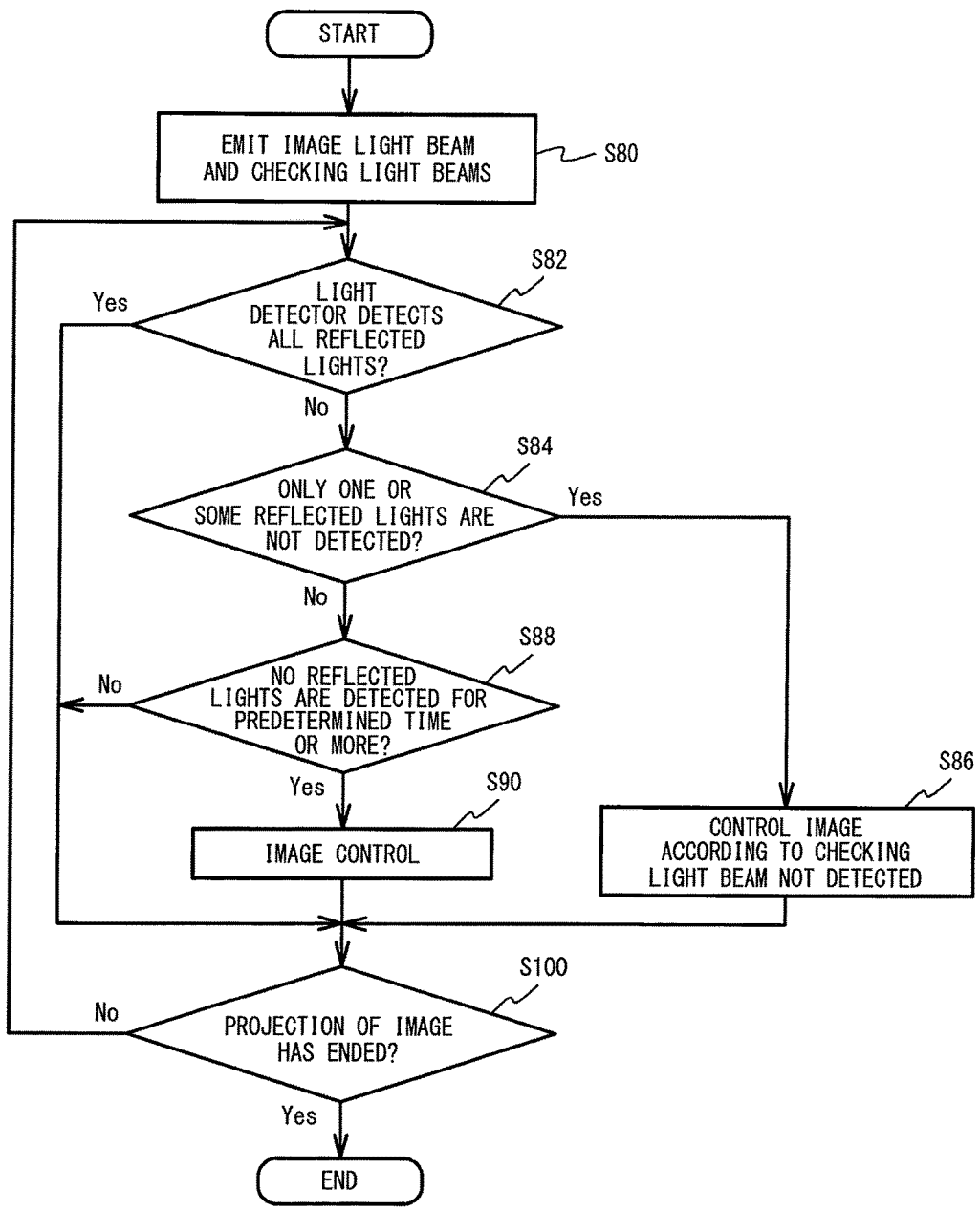
FIG. 20 is a flowchart of an exemplary process by the controller of an image projection device in accordance with a fourth embodiment.

FIG. 20 is a flowchart of an exemplary process executed by the controller 20 of the image projection device 400 of the fourth embodiment. As illustrated in FIG. 20, at step S80, the controller 20 causes the light source 12 to emit the image light beam 34a based on input image data, and causes the light source 12 to emit a plurality of the checking light beams 34b in association with the emission of the image light beam 34a.

Then, at step S82, the controller 20 determines whether the light detector 18 detects the reflected lights 46 of all the plurality of the checking light beams 34b. When all the reflected lights 46 are detected, the determination at step S82 becomes Yes, and the process moves to step S100.

On the other hand, when the reflected light 46 of at least one checking light beam 34b of the plurality of the checking light beams 34b is not detected (step S82: No), the process moves to step S84. At step S84, the controller 20 determines whether only the reflected lights 46 of one or some checking light beams 34b of the plurality of the checking light beams 34b are not detected. When only the reflected lights 46 of one or some checking light beams 34b are not detected (step S84: Yes), the controller 20 moves to step S86 and controls the image formed by the image light beam 34a in accordance with the reflected lights 46 not detected (i.e., the checking light beams 34b not detected). Thereafter, the process moves to step S100.

The controller 20 stops, pauses, or reproduces a moving image, switches to a different image, or the like as image control, for example. In the case of pause, the image may be paused while being displayed, or the displaying of the image itself may be also paused. Alternatively, the controller 20 may switch one of images of the front, back, left, and right of the user to another of the images, or may switch an image different from images of the front, back, left, and right to one of the images of the front, back, left, and right or vice versa. For example, the controller 20 may switch one of images of the front, back, left, and right of the user to an image indicating the positional information of the current position of the user, or vice versa. Therefore, the image projection device may include an image capturing unit (e.g., a camera) that captures images of the front, back, left, and right of the user and/or a position detection unit (e.g., a Global Positioning System (GPS) sensor) that detects the position of the image projection device.

Figure 21A:
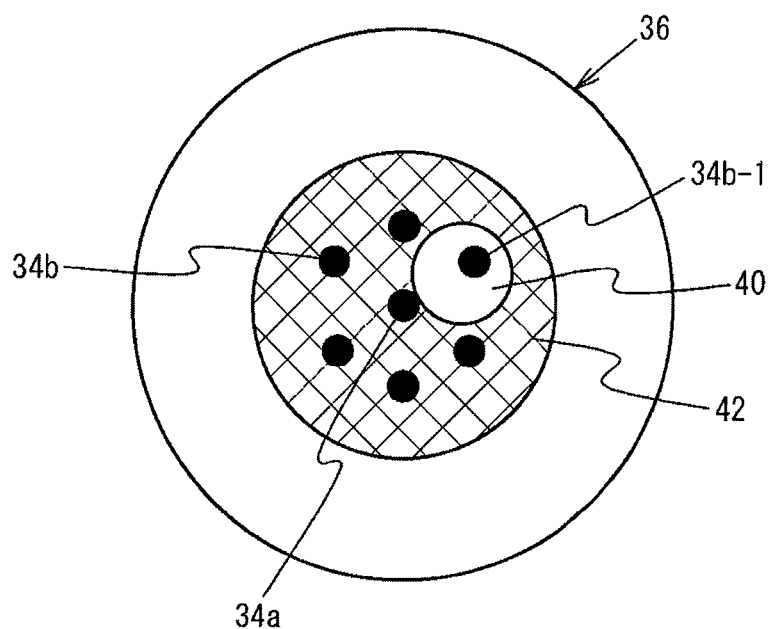
FIG. 21A and FIG. 21B are diagrams for describing the control of an image according to the checking light beam not detected.
Figure 21B:
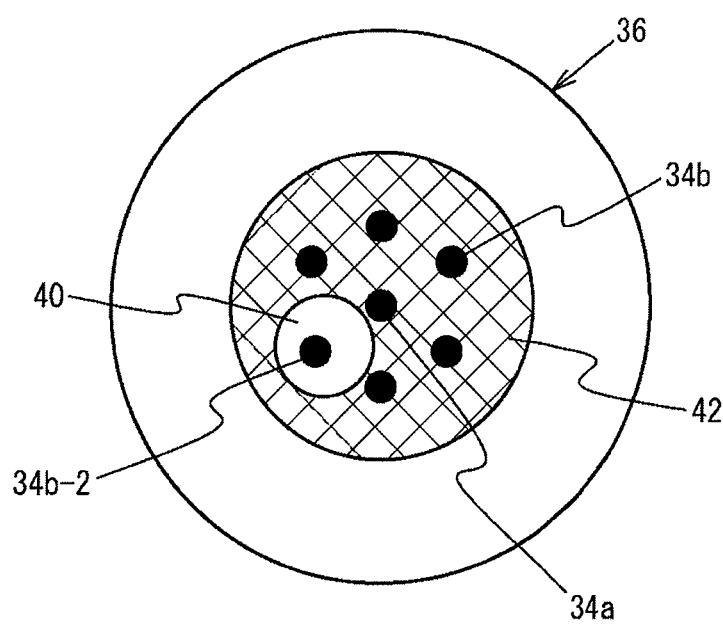

Here, the control of the image according to the checking light beam 34b not detected will be described with FIG. 21A and FIG. 21B. As illustrated in FIG. 21A, when the reflected light 46 of a first checking light beam 34b-1 of a plurality of the checking light beams 34b is not detected, the controller 20 conducts a first control on the image. As illustrated in FIG. 21B, when the reflected light 46 of a second checking light beam 34b-2 is not detected, the controller 20 conducts a second control, which differs from the first control, on the image.

As illustrated in FIG. 20, when it is not determined that only the reflected lights 46 of one or some checking light beams 34b are not detected (step S84: No), the controller 20 moves to step S88, and determines whether none of the reflected lights 46 of the plurality of the checking light beams 34b has been detected for a predetermined time or more. When none of the reflected lights 46 has been detected for the predetermined time or more (step S88: Yes), the controller 20 moves to step S90, and conducts the control different from the control conducted at step S86 on the image. Thereafter, the process moves to step S100. On the other hand, when it is not determined that none of the reflected lights 46 has been detected for the predetermined time or more (step S88: No), the process moves to step S100. The reason why it is determined whether none of the reflected lights 46 has been detected for the predetermined period or more is to exclude the closing of the eyelid that does not intend to control the image.

At step S100, the controller 20 executes a process that is the same as or similar to that of step S16 in FIG. 7 in the first embodiment.

As described above, in the fourth embodiment, the controller 20 controls the image formed by the image light beam 34a by controlling the light source 12 based on the detection result of the reflected lights 46 by the light detector 18. This control allows the user to control the image by moving the eyeball 36 and/or the eyelid 37.

Additionally, in the fourth embodiment, as illustrated in FIG. 21A and FIG. 21B, when the reflected light 46 of the first checking light beam 34b-1 of a plurality of the checking light beams 34b is not detected, the first control is conducted on the image, while when the reflected light 46 of the second checking light beam 34b-2 is not detected, the second control, which is different from the first control, is conducted on the image. This configuration allows the user to conduct different controls on the image by moving the eyeball 36 in different directions.

Additionally, in the fourth embodiment, as described at steps S86 and S90 in FIG. 20, when the reflected lights 46 of one or some checking light beams 34b of a plurality of the checking light beams 34b are not detected, the first control is conducted on the image, while when none of the reflected lights 46 of the checking light beams 34b is not detected for a predetermined time or more, the second control different from the first control is conducted on the image. This configuration allows the user to conduct different controls on the image by moving the eyeball 36 or moving the eyelid 37.

At step S90 in FIG. 20 in the fourth embodiment, the controller 20 may detect the length of time for which the reflected light 46 is not detected and conduct different controls on the image according to the length of the time.

The fourth embodiment may be combined with the control of the movement of the projection positions of the image light beam 34a and the checking light beam 34b in conjunction with each other described in the second embodiment or the warning control described in the third embodiment. The fourth embodiment describes a case where a plurality of the checking light beams 34b are projected onto the eyeball 36, but one checking light beam 34b may be projected on the eyeball 36.

Fifth Embodiment

Figure 22:
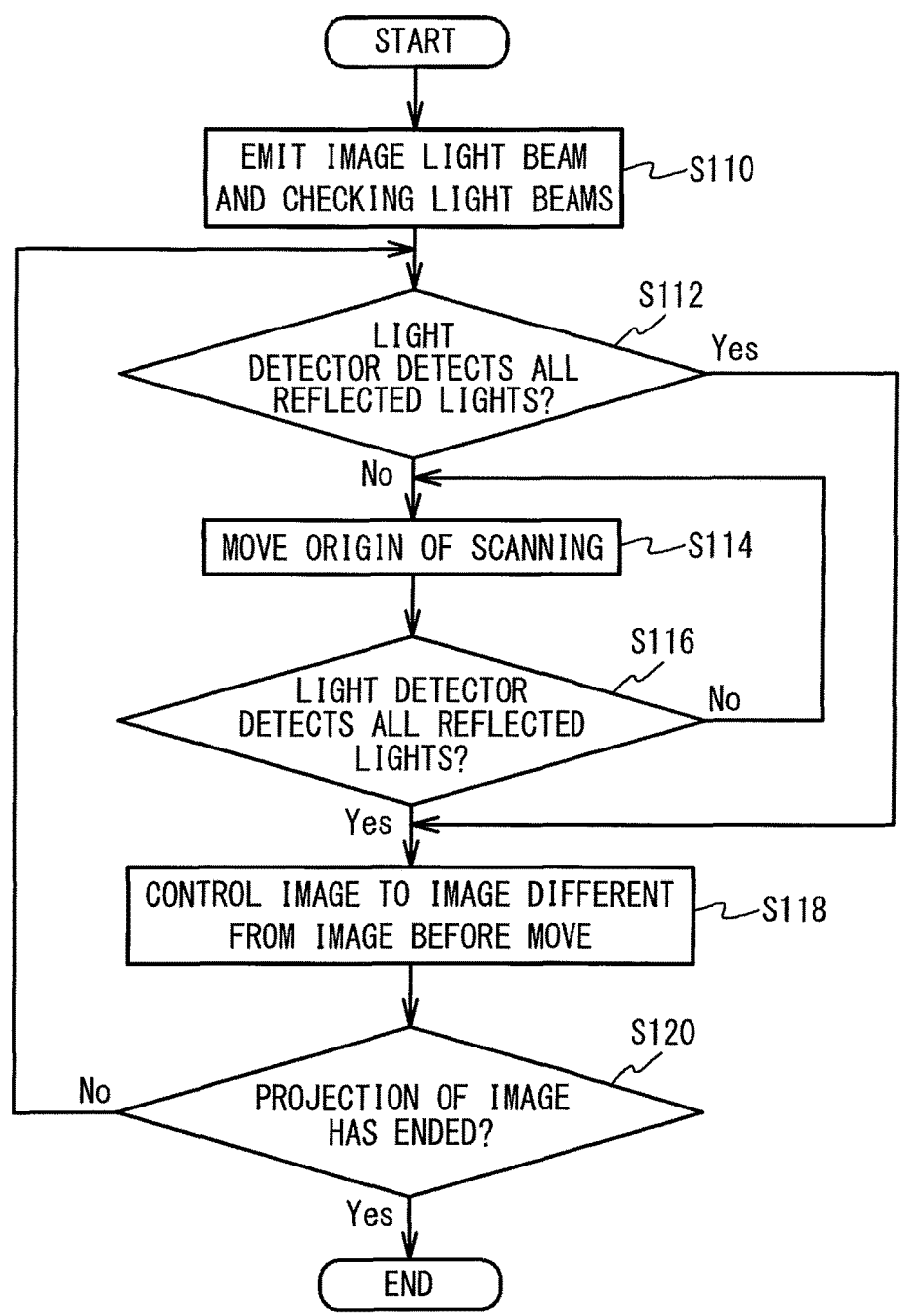
FIG. 22 is a flowchart of an exemplary process by the controller of an image projection device in accordance with a fifth embodiment.

An image projection device 500 in accordance with a fifth embodiment is the same as or similar to that of the first embodiment illustrated in FIG. 1, and the description thereof is thus omitted. FIG. 22 is a flowchart of an exemplary process by the controller 20 of the image projection device 500 in accordance with the fifth embodiment. As illustrated in FIG. 22, at step S110 through step S116, the controller 20 executes processes that are the same as or similar to those of step S20 through step S26 in FIG. 11 in the second embodiment.

Then, at step S118, the controller 20 controls the image so that an image different from the image projected before the image light beam 34a and the checking light beam 34b are moved in conjunction with each other at steps S114 and S116 is projected. The example of image control is the same as that of the fourth embodiment, and the description thereof is thus omitted. Thereafter, the controller 20 moves to step S120, and executes a process that is the same as or similar to that of step S16 in FIG. 7 in the first embodiment.

In the fifth embodiment, the controller 20 controls the light source 12 to make the image to be projected after the image light beam 34a and the checking light beam 34b are moved in conjunction with each other different from the image projected before the image light beam 34a and the checking light beam 34b are moved in conjunction with each other. This control allows the user to visually recognize the image according to the direction in which the user faces. For example, the user is able to visually recognize different images of images of the front, back, left, and right of the user in accordance with the direction that the user faces.

The fifth embodiment may be combined with the warning control described in the third embodiment. The fifth embodiment describes a case where a plurality of the checking light beams 34b are projected onto the eyeball 36, but one checking light beam 34b may be projected onto the eyeball 36.

In the first through fifth embodiments, two or more checking light beam 34b of the plurality of the checking light beams 34b may be projected onto the iris 42 at the same time. In this case, a plurality of the light detectors 18 need to be provided.

The first through fifth embodiments describe a case where a plurality of the checking light beams 34b are projected onto the iris 42 at six locations so as to surround the periphery of the pupil 40 when the image light beam 34a passes through the pupil 40 as illustrated in FIG. 4. To effectively inhibit the image light beam 34a from not passing through the pupil 40, a plurality of the checking light beams 34b are preferably projected onto the iris 42 so as to sandwich the pupil 40 when the image light beam 34a passes through the pupil 40, more preferably projected onto the iris 42 so as to sandwich the pupil 40 at two or more locations. Additionally, a plurality of the checking light beams 34b are preferably projected onto the iris 42 so as to sandwich the pupil 40 in the vertical and horizontal directions when the image light beam 34a passes through the pupil 40.

In the first through fifth embodiments, the image light beam 34a and the checking light beam 34b are preferably in the positional relation in which the image light beam 34a passes through the vicinity of the edge of the pupil 40 when the checking light beam 34b does not enter the iris 42 and passes through the pupil 40 as illustrated in FIG. 15. This configuration inhibits a lack of the image.

The first through fifth embodiments describe a case where the controller 20 is provided to an external device, but do not intend to suggest any limitation, and the controller 20 may be provided to the temple 30 of the spectacle type frame. The light source 12 and the first mirror 14 may be located at the outer side of the temple 30 of the spectacle type frame, or located at the inner side of the temple 30 by widening the width of the temple 30. The light source 12 may not be necessarily provided to the temple 30 of the spectacle type frame, and may be provided to a component separate from the spectacle type frame. In this case, it is only required that the light beam 34 emitted from the light source 12 is configured to enter the first mirror 14 through an optical fiber and the like. The image light beam 34a and the checking light beam 34b are not necessarily projected onto one of the eyeballs 36, and the image light beam 34a and the checking light beam 34b may be projected onto both the eyeballs 36.

Although the desirable embodiments of the present invention has been described in detail, the present invention is not limited to a certain embodiment, and it should be understood that the various change, substitutions, and alterations could be made hereto without departing from the spirit and scope of the invention.

The invention claimed is:

1. An image projection device comprising:
a light source that emits an image light beam and a checking light beam, the image light beam forming an image;
an optical system that projects the image light beam emitted from the light source onto a first surface region of an eye of a user to project the image light beam onto a retina of the user, and projects the checking light beam emitted from the light source onto a second surface region of the eye of the user, the second surface region being distant from the first surface region;
a light detector that detects a reflected light that is the checking light beam reflected by the eye of the user; and
a controller that moves, when the light detector does not detect the reflected light, projection positions of the image light beam and the checking light beam onto the eye of the user in conjunction with each other by controlling the optical system so that the light detector detects the reflected light.

2. The image projection device according to claim 1, wherein
the optical system includes:
a mirror that scans the image light beam emitted from the light source and reflects the checking light beam emitted from the light source; and
a projection unit that projects the image light beam and the checking light beam onto the eye of the user in a positional relation in which the checking light beam reflected by the mirror is projected onto the iris of the user when the image light beam scanned by the mirror passes through the pupil of the user and is projected onto the retina of the user, and
the controller moves the projection positions of the image light beam and the checking light beam in conjunction with each other by moving a position of the mirror to move an origin of the scan.

3. The image projection device according to claim 1, wherein
the optical system includes:
a mirror that scans the image light beam emitted from the light source and reflects the checking light beam emitted from the light source; and
a projection unit that projects the image light beam and the checking light beam onto the eye of the user in a positional relation in which the checking light beam reflected by the mirror is projected onto the iris of the user when the image light beam scanned by the mirror passes through the pupil of the user and is projected onto the retina of the user, and
the controller moves the projection positions of the image light beam and the checking light beam in conjunction with each other by moving the light source, the mirror, and the projection unit together.

4. The image projection device according to claim 1, wherein
the optical system projects a plurality of the checking light beams onto different positions of the eye of the user at different times, and
the controller moves the projection positions of the image light beam and the checking light beam in conjunction with each other based on whether the light detector detects the reflected lights of the plurality of the checking light beams at the different times.

5. The image projection device according to claim 1, wherein
the optical system projects a plurality of the checking light beams onto different positions of the eye of the user, and
when the light detector does not detect at least one reflected light of the reflected lights of the plurality of the checking light beams, the controller moves the projection positions of the image light beam and the checking light beam in conjunction with each other so that a projection position of the image light beam moves toward a projection position of the checking light beam corresponding to the reflected light not detected.

6. The image projection device according to claim 1, wherein
the controller controls the light source to make the image formed by the image light beam after the projection positions of the image light beam and the checking light beam are moved in conjunction with each other different from an image formed by the image light beam before the projection positions of the image light beam and the checking light beam are moved in conjunction with each other.

7. The image projection device according to claim 1, wherein
the optical system projects the image light beam and the checking light beam onto the eye of the user in a positional relation in which the checking light beam is projected onto an iris of the user when the image light beam passes through a pupil of the user and is projected onto the retina of the user.

8. The image projection device according to claim 1, wherein
the controller issues a warning to the user by controlling the light source based on a detection result of the reflected light by the light detector.

9. The image projection device according to claim 8, wherein the controller controls the light source to emit a light for warning to an integrated region including the first surface region and the second surface region of the eye of the user.

10. The image projection device according to claim 1, wherein
the optical system includes:
a mirror that scans the image light beam and reflects the checking light beam; and
a projection unit that projects the image light beam and the checking light beam onto the eye of the user in a positional relation in which the checking light beam reflected by the mirror is projected onto the iris of the user when the image light beam scanned by the mirror passes through the pupil of the user and is projected onto the retina of the user,
the mirror oscillates beyond a range of an image projected onto the retina of the user in a first direction and a second direction intersecting with the first direction, and
the image light beam is emitted to the mirror in a period corresponding to the range of the image in oscillation of the mirror and the checking light beam is emitted to the mirror at time corresponding to an outside of the range of the image in the oscillation of the mirror.

11. The image projection device according to claim 10, wherein
the projection unit includes a first region where the image light beam is incident and a second region that is optically discontinuous with the first region and where the checking light beam is incident.

12. An image projection device comprising:
a light source that emits an image light beam and a plurality of checking light beam, the image light beam forming an image;
an optical system that projects the image light beam emitted from the light source onto a first surface region of an eye of a user to project the image light beam onto a retina of the user, and projects the plurality of the checking light beams emitted from the light source onto different positions of a second surface region of the eye of the user, the second surface region being distant from the first surface region;
a light detector that detects reflected lights that are the plurality of the checking light beam reflected by the eye of the user; and
a controller that conducts a first control on the image formed by the image light beam by controlling the light source when the light detector does not detect the reflected light of a first checking light beam, which is projected onto a first position of the eye of the user, of the plurality of the checking light beams and conducts a second control on the image formed by the image light beam by controlling the light source when the light detector does not detect the reflected light of a second checking light beam, which is projected onto a second position of the eye of the user, of the plurality of the checking light beams, the second control differing from the first control, the second position differing from the first position; or conducts a third control on the image formed by the image light beam by controlling the light source when the light detector does not detect the reflected lights of one or some checking light beams of the plurality of the checking light beams and conducts a fourth control on the image formed by the image light beam by controlling the light source when the light detector detects none of the reflected lights of the plurality of the checking light beams, the fourth control differing from the third control.

* * * * *